(12) United States Patent
Jitsukawa

(10) Patent No.: US 9,277,414 B2
(45) Date of Patent: Mar. 1, 2016

(54) WIRELESS COMMUNICATION SYSTEM, BASE STATION, AND MOBILE STATION

(71) Applicant: FUJITSU LIMITED, Kawasaki-shi, Kanagawa (JP)

(72) Inventor: Daisuke Jitsukawa, Adachi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/228,846

(22) Filed: Mar. 28, 2014

(65) Prior Publication Data

US 2014/0211717 A1 Jul. 31, 2014

Related U.S. Application Data

(63) Continuation of application No. PCT/JP2011/072677, filed on Sep. 30, 2011.

(51) Int. Cl.
*H04W 72/04* (2009.01)
*H04W 88/08* (2009.01)
*H04W 16/14* (2009.01)
*H04L 5/00* (2006.01)
*H04W 28/16* (2009.01)
(Continued)

(52) U.S. Cl.
CPC .............. *H04W 16/14* (2013.01); *H04L 5/006* (2013.01); *H04L 5/0035* (2013.01); *H04L 5/0039* (2013.01); *H04L 5/0053* (2013.01); *H04L 5/0073* (2013.01); *H04W 28/16* (2013.01); *H04L 1/1861* (2013.01); *H04W 72/1226* (2013.01)

(58) Field of Classification Search
USPC ........................................................ 370/329
See application file for complete search history.

(56) References Cited

U.S. PATENT DOCUMENTS 8,412,256 B2 * 4/2013 Lee et al. ........................ 455/522
8,521,215 B2 * 8/2013 Hirakawa et al. .............. 455/524
(Continued)

FOREIGN PATENT DOCUMENTS

WO 2010/032791 A1 3/2010
WO 2010/067598 A1 6/2010

OTHER PUBLICATIONS

3GPP TS 36.211 V10.2.0 (Jun. 2011), "3rd Generation Partnership Project; Technical Specification Group Radio Access Network; Evolved Universal Terrestrial Radio Access(E-UTRA); Physical Channels and Modulation (Release 10)", pp. 1-103 (http://www.3gpp.org).
(Continued)

*Primary Examiner* — Edan Orgad
*Assistant Examiner* — Sithu Ko
(74) *Attorney, Agent, or Firm* — Fujitsu Patent Center

(57) ABSTRACT

A wireless communication system 1 performs inter-cell coordination control that coordinates a pico base station 100 and a macro base station 200 with each other and transmits a signal to a mobile station 10 of a picocell. The pico base station 100 includes a controller 100a and a communication unit 100b. The controller 100a interleaves resources of an E-PDCCH of the picocell corresponding to a predetermined resource unit based on a coordinated area ID that is an identifier common to the pico base station 100 and the macro base station 200. The communication unit 100b transmits a control signal to the mobile station 10 of the picocell using a first resource of the E-PDCCH of the picocell that corresponds to at least a part of the predetermined resource unit and is to be decoded by the mobile station 10 of the picocell.

11 Claims, 19 Drawing Sheets

(51) Int. Cl.
*H04W 72/12* (2009.01)
*H04L 1/18* (2006.01)

(56) References Cited

U.S. PATENT DOCUMENTS

2011/0243191 A1   10/2011   Nakao et al.
2012/0282936 A1*  11/2012   Gao et al. ............... 455/450

OTHER PUBLICATIONS

3GPP TS 36.212 V10.2.0 (Jun. 2011), "3rd Generation Partnership Project; Technical Specification Group Radio Access Network; Evolved Universal Terrestrial Radio Access(E-UTRA); Multiplexing and Channel Coding (Release 10)", pp. 1-78 (http://www.3gpp.org).
3GPP TS 36.213 V10.2.0 (Jun. 2011), "3rd Generation Partnership Project; Technical Specification Group Radio Access Network; Evolved Universal Terrestrial Radio Access (E-UTRA); Physical Layer Procedures (Release 10)", pp. 1-120 (http://www.3gpp.org).
3GPP TR 36.814 V9.0.0 (Mar. 2010), "3rd Generation Partnership Project; Technical Specification Group Radio Access Network; Evolved Universal Terrestrial Radio Access (E-UTRA); Further Advancements for E-UTRA Physical Layer Aspects (Release 9)", pp. 1-104 (http://www.3gpp.org).
3GPP TSG RAN WG1 Meeting #65, R1-111636, Barcelona, Spain, May 9-13, 2011, NTT DOCOMO, "DL Control Channel Enhancement for DL MIMO in Rel-11", 6.3.2.2, pp. 1-6.
International Search Report, mailed in connection with PCT/JP2011/072677 and mailed Jan. 10, 2012.
EESR—Extended European Search Report of European Patent Application No. 11873197.5 mailed Feb. 23, 2015.
Kyocera; "Range Expansion Performance and Interference Management for Control Channels in Outdoor Hotzone Scenario"; 3GPP Draft; R1-102363 RE CCH OUTHOT, 3GPP: Mobile Competence Centre; 650, Route Des Lucioles; F-06921; Apr. 6, 2010; XP050419587.
JPOA—Office Action of Japanese Patent Application No. 2013-535808 mailed Sep. 8, 2015, with English translation.

* cited by examiner

WIRELESS COMMUNICATION SYSTEM, BASE STATION, AND MOBILE STATION

CROSS-REFERENCE TO RELATED APPLICATION

This application is a continuation application of International Application PCT/JP2011/072677, filed on Sep. 30, 2011, and designating the U.S., the entire contents of which are incorporated herein by reference.

FIELD

The present invention relates to a wireless communication system, a base station, a mobile station, and a wireless communication method.

BACKGROUND

Conventionally, for Long Term Evolution (LTE) and LTE-Advanced as a next-generation mobile communication system, a heterogeneous network has been studied aiming at enlarging system capacity and coverage. The heterogeneous network is a network in which a macrocell and a cell constituted by a base station with low transmission power (hereinafter referred to as a "picocell") are arranged in a coexisting manner. In such a network, when the macrocell and the picocell are operated at the same frequency, interference from the macrocell to a picocell becomes a problem. In other words, in a mobile station (hereinafter referred to as a "pico base station") connected to a base station of the picocell (hereinafter referred to as a "pico mobile station"), a signal from the pico base station is interfered with by a signal from a base station of the macrocell (hereinafter referred to as a "macro base station").

The above-described inter-cell interference influences the communication quality in physical channels (a control channel and a shared channel). In particular, in a system in which subframe transmission timing is synchronized between cells, the inter-cell interference may occur between the control channels and between the shared channels. As a technology that reduces the inter-cell interference, an inter-cell coordination control technology can be adopted. Examples of the inter-cell coordination control technologies can include a technology called Coordinated Multiple Point (CoMP), which is under study in LTE-Advanced (Release-11), and another technology called Inter-Cell Interference Coordination (ICIC) in LTE (Release-8). In the inter-cell coordination control technologies such as CoMP and ICIC, a plurality of base stations are coordinated to transmit a data signal using the shared channel to a mobile station.

In recent LTE, there is concern about a shortage of the capacity of the control channel when communications are performed simultaneously among many users. As a technology for solving the capacity shortage of the control channel, a technology is under study that enhances the control channel to a shared channel region or the like. This technology frequency-multiplexes a Physical Downlink Control Channel (PDCCH) as one of the control channels to resources of a Physical Downlink Shared Channel (PDSCH) as a shared channel, thereby enhancing the PDCCH. The enhanced PDCCH is called Enhanced-PDCCH (E-PDCCH)

Non Patent Literature 1: 3GPP TS 36.211 V10.2.0 (2011-06)

Non Patent Literature 2: 3GPP TS 36.212 V10.2.0 (2011-06)

Non Patent Literature 3: 3GPP TS 36.213 V10.2.0 (2011-06)

Non Patent Literature 4: 3GPP TR 36.814 V9.0.0 (2010-03)

Non Patent Literature 5: 3GPP R1-111636 (2011-05)

The conventional technology does not consider reducing the inter-cell interference of the control channel enhanced to the shared channel region or the like.

For example, in the E-PDCCH, which is the control channel enhanced to the shared channel region or the like, inter cell coordination control such as CoMP and ICIC is considered to be adopted as is the case with the PDSCH as the shared channel. However, it is difficult for the E-PDCCH that is currently under study to adopt the inter-cell coordination control such as CoMP and ICIC, because of being arranged in a scattered manner across the entire bandwidth allocated. As a result, control signals using the E-PDCCH may interfere with each other between cells.

SUMMARY

A wireless communication system performs inter-cell coordination control that coordinates a base station of a first cell and a base station of a second cell with each other and that transmits a signal to a mobile station of the first cell. The base station of the first cell includes a first controller that interleaves resources of a control channel of the first cell enhanced to a predetermined region of the first cell corresponding to a predetermined resource unit based on a common identifier that is an identifier common to the base station of the first cell and the base station of the second cell; and a first communication unit that transmits a control signal to the mobile station of the first cell using a first resource of the control channel of the first cell that corresponds to at least a part of the predetermined resource unit and is to be decoded by the mobile station of the first cell. The base station of the second cell includes a second controller that interleaves resources of a control channel of the second cell enhanced to a predetermined region of the second cell corresponding to the predetermined resource unit based on the common identifier; and a second communication unit that transmits a control signal to the mobile station of the first cell using a second resource of the control channel of the second cell that corresponds to at least a part of the predetermined resource unit and is to be decoded by the mobile station of the first cell. The mobile station of the first cell includes a third communication unit that receives the control signal transmitted from the base station of the first cell using the first resource and receives the control signal transmitted from the base station of the second cell using the second resource.

The object and advantages of the invention will be realized and attained by means of the elements, and combinations particularly pointed out in the claims.

It is to be understood that both the foregoing general description and the following detailed description are exemplary and explanatory and are not restrictive of the invention.

DESCRIPTION OF EMBODIMENTS

Described below in detail with reference to the accompanying drawings are embodiments of a wireless communication system, a base, station, a mobile station, and a wireless communication method disclosed by the present application. This invention is not limited to the embodiments.

Figure 1:
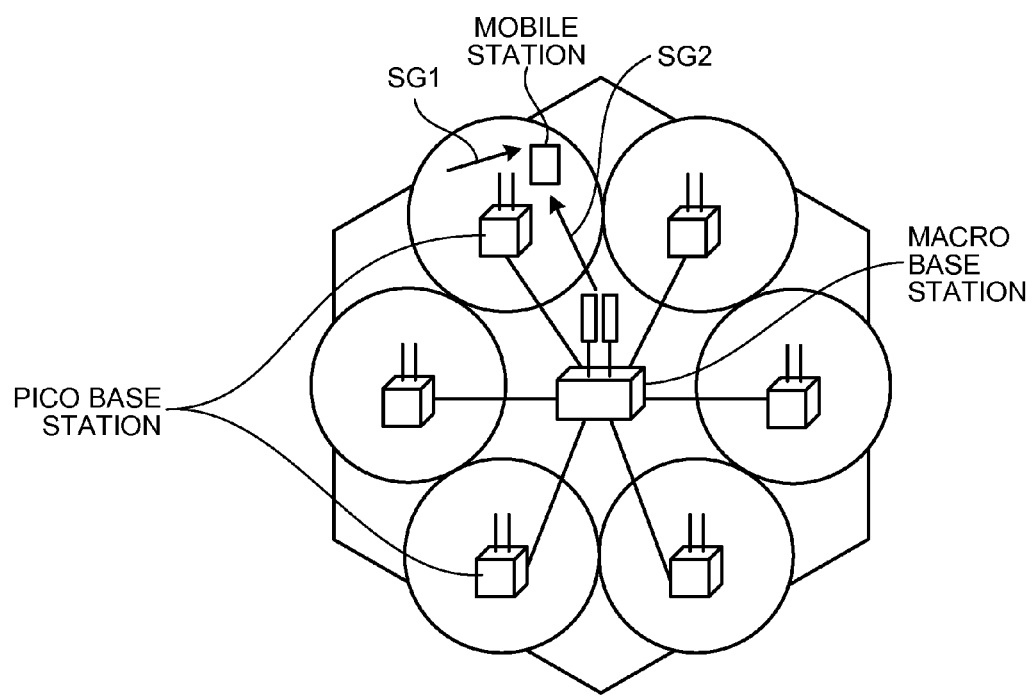
FIG. 1 is a diagram illustrating an example of a heterogeneous network.

Described first with reference to FIG. 1 to FIG. 5 is a technology as a basis of the wireless communication system disclosed by the present application. FIG. 1 is a diagram illustrating an example of a heterogeneous network. The heterogeneous network illustrated in FIG. 1 is a network in which a micro cell and picocells are arranged in a coexisting manner, in which a macro base station and pico base stations are connected through wired interfaces such as optical fibers. In such a heterogeneous network, when the macrocell and the picocells are operated at the same frequency, for example, in a mobile station connected to a pico base station, a downlink desired signal SG1 from the pico base station is influenced by a large interference signal SG2 from the macro base station. As a result, the communication quality of the physical channels (the control channel and the shared channel) may degrade.

Figure 2:
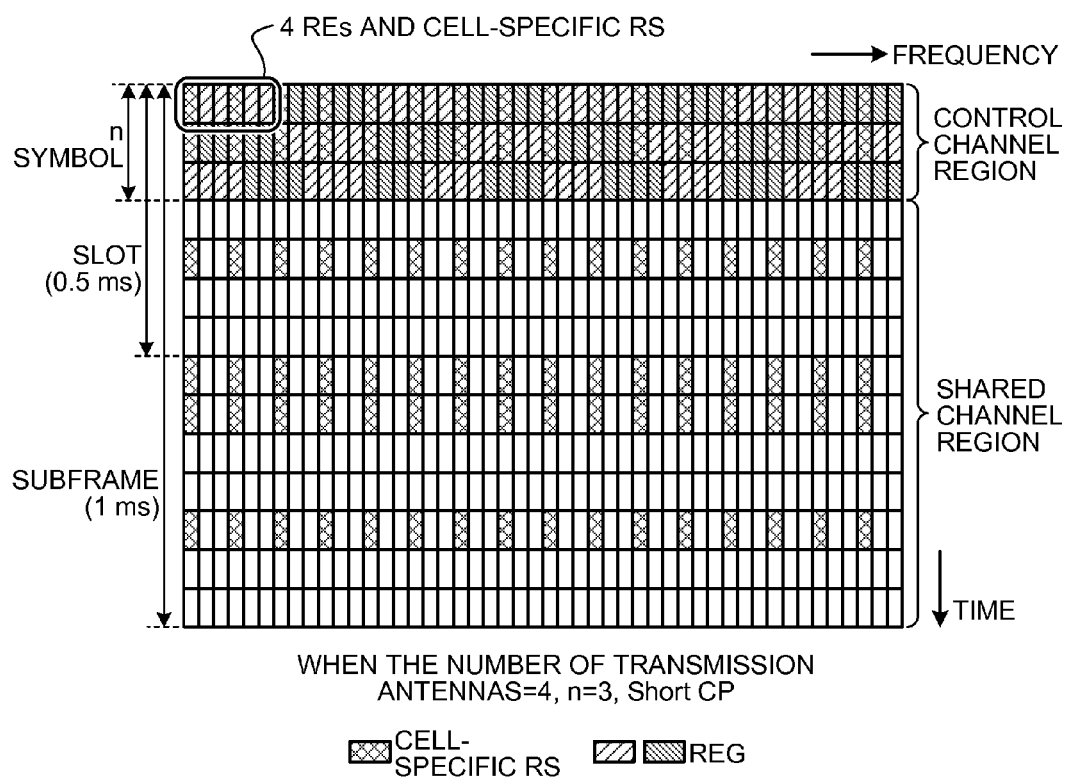
FIG. 2 is a diagram used for describing a mapping method for physical channels.

Before describing the influence of this inter-cell interference on the physical channels, described with reference to FIG. 2 are the structure of the physical channels and a method for mapping to time and frequency resources. FIG. 2 is a diagram used for describing a mapping method for the physical channels. As illustrated in FIG. 2, in the time domain, a subframe with a length of 1 ms is made up of 14 Orthogonal Frequency Division Multiplexing (OFDM) symbols, and a control channel is mapped to the front n (=1 to 3) OFDM symbols. Examples of the control channel include a Physical Control Format Indicator Channel (PCFICH), a Physical Hybrid ARQ Indicator Channel (PHICH), and a Physical Downlink Control Channel (PDCCH).

The value of n is defined as control information called a Control Format Indicator (CFI). Physical Downlink Shared Channels (PDSCH) for use in the transmission of user data and the like are mapped to the remaining OFDM symbols. In the frequency domain, a resource block (RB) as a frequency resource allocation unit is made up of 12 subcarriers, and the shared channel for each user is frequency-multiplexed in an RE unit. Cell-specific reference signals (RSs) for use in channel estimation and the like are sparsely mapped in the time and frequency domains. As the minimum unit of the time and frequency resource, a resource element (RE) is defined that is an area surrounded by one OFDM symbol and one subcarrier. As a mapping unit of the control channel, a resource element group (REG) is defined that is made up of four consecutive REs in the frequency domain except the RSs.

Described next in detail is particularly a mapping method for the control channel of the above-described physical channels. The PCFICH is a physical channel for use in the transmission of the CFI. Four REGs for the PCFICH are mapped in a scattered manner at substantially equal intervals within a system bandwidth with a subcarrier position depending on a cell identity (ID) as a starting point in the first OFDM symbol in the subframe.

The PHICH is a physical channel for use in the transmission of ACK/NACK information on an uplink shared channel. Depending on a parameter Ng reported from a higher layer, the number of PHICH groups is determined, and three REGs are used for each of the PHICH groups. The three REGs are mapped in a scattered manner at substantially equal intervals in the system bandwidth with a subcarrier position depending on the cell ID as a starting point among REGs to which the PCFICH is not mapped.

Figure 3:
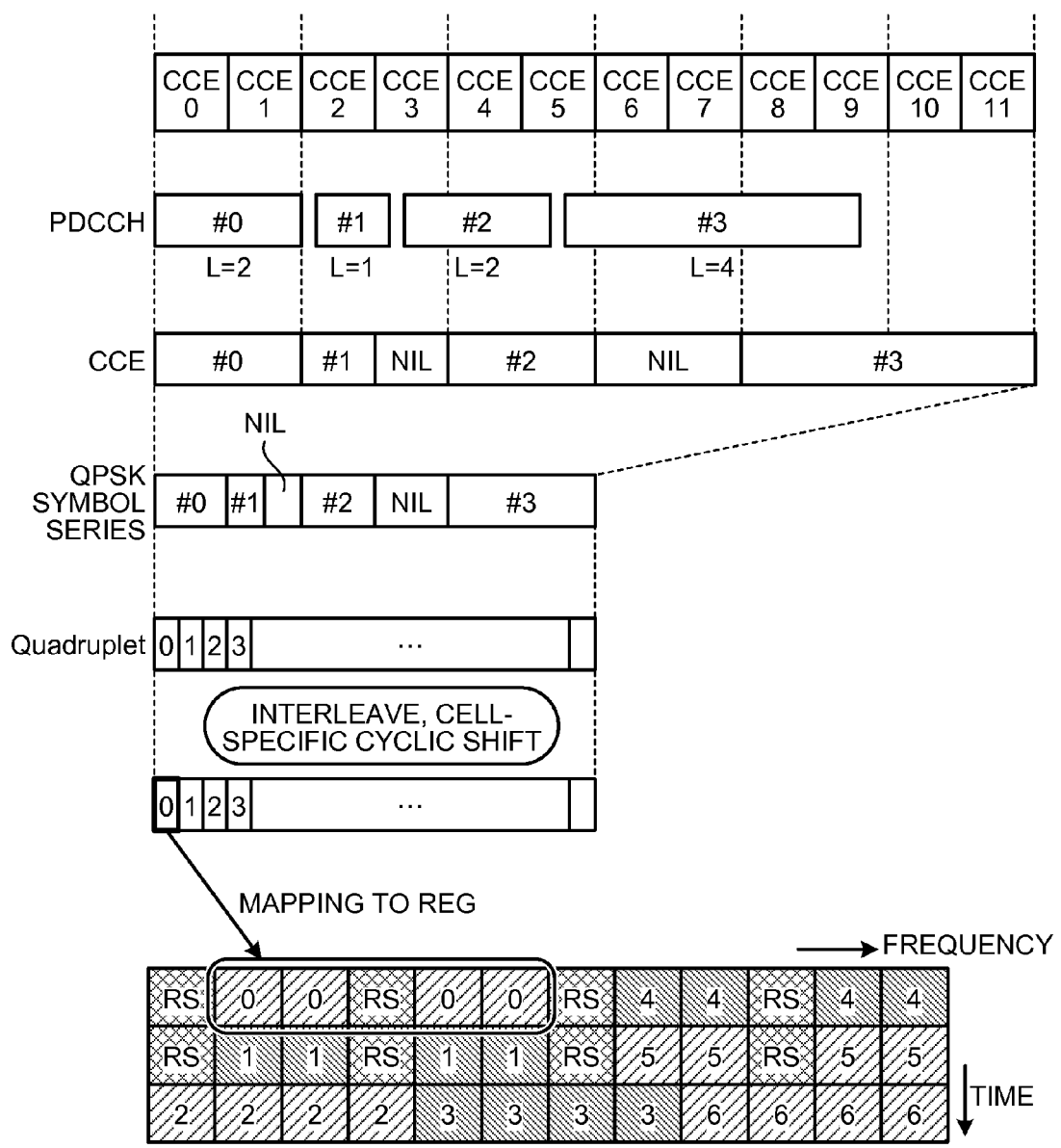
FIG. 3 is a diagram used for describing a mapping method for a PDCCH.

The PDCCH is a physical channel for use in the transmission of broadcast information and scheduling information on user data. FIG. 3 is a diagram used for describing a mapping method for the PDCCH. A Control Channel Element (CCE) is defined as a resource unit used by each PDCCH. The CCE corresponds to nine REGs (=36 REs). An aggregation level (hereinafter denoted as an "AL") is a parameter corresponding to the number of CCEs used by the PDCCH, that is, a spreading factor. The AL is set to be any of $\{1, 2, 4, 8\}$ by a base station in accordance with the state of a wireless channel or the like. As is described below in detail, each PDCCH is multiplexed with an appropriate offset added and is modulated by Quadrature Phase Shift Keying (QPSK). Each PDCCH is interleaved in units of four modulation symbols and is then mapped to an REG to which neither the PCFICH nor the PHICH is mapped.

In the interleaving processing, the base station first block-interleaves the QPSK-modulated PDCCH in units of four modulation symbols and performs cyclic shift based on the cell ID in units of four modulation symbols. Specifically, a signal after being block-interleaved is represented by Formula 1 below.

$$w^{(p)}(0), \ldots, w^{(p)}(M_{quad}-1)$$

where, p: Antenna No.

$M_{Quad}$: Total number of units of four modulation symbols (1)

A signal after the cyclic shift is represented by Formula 2 below.

$$\overline{w}^{(p)}(0), \ldots, \overline{w}^{(p)}(M_{quad}-1)$$

where, $$\overline{w}^{(p)}(i)=w^{(p)}((i+N_{ID}^{cell}) \bmod M_{quad})$$

$N_{ID}^{cell}$: Cell ID (2)

With reference to Formula 1 and Formula 2, a mechanism is understood that when the condition of the number of modulation symbols or the cell ID differs, the rule of sorting in the interleaving processing also differs.

Because the multiplexed position of the PDCCH is not reported to the mobile station from the base station, in decoding PDCCH, the mobile station searches for potential candidates for the multiplexed position and attempts to decode each reception signal. In order to limit the number or times of decode to such an extent as being capable of processing at the mobile station, a concept of a search space (hereinafter referred to as an "SS") has been introduced. As a result, the base station multiplexes the PDCCH at an arbitrary position within the limited search space, and the mobile station needs to search only the search space to attempt decoding.

Figure 4:
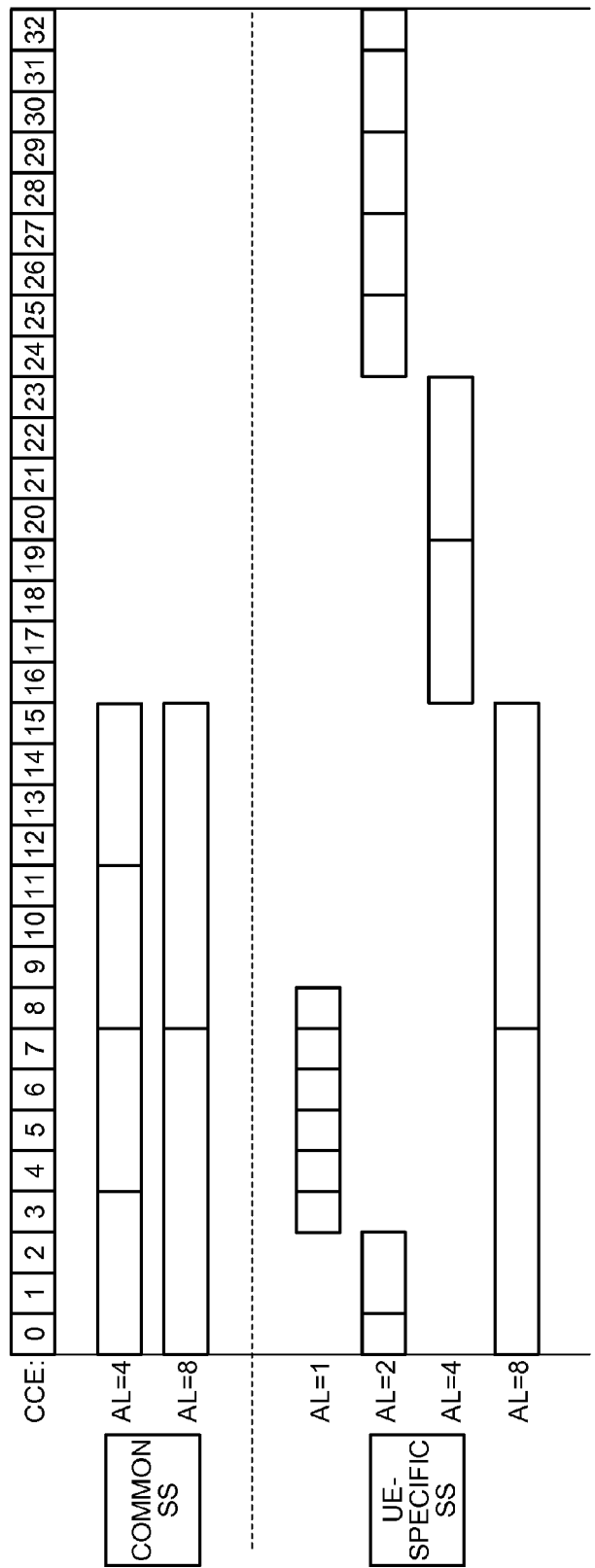
FIG. 4 is a diagram used for describing a search space of the PDCCH.

FIG. 4 is a diagram used for describing a search space of the PDCCH. FIG. 4 illustrates an example of search spaces in a certain subframe when there are 33 available CCEs. A common search space provided for a PDCCH that transmits the scheduling information of broadcast information is always fixed to the first 16 CCEs. A user equipment (UE)-specific search space provided for a PDCCH that transmits the scheduling information of the user data has a different front position by mobile station, AL, and subframe. This front position is determined by a hash function. The number of available CCEs can vary in accordance with a system bandwidth, an antenna configuration, a CFI, or Ng.

Described next is the influence of inter-cell interference on the physical channels. In a system in which subframe transmission timing is synchronized among cells, inter-cell interference may occur between control channels and between shared channels. In order to reduce such inter-cell interference, LTE provides an inter-cell coordination control technology for the shared channels. The inter-cell coordination control technology is, for example, a technology called Coordinated Multiple Point (CoMP) that is under study in LTE-Advanced (Release-11) and a technology called Inter-Cell Interference Coordination technology (ICIC) in LTE (Release-8). In these inter-cell interference coordination technologies such as CoMP and ICIC, a plurality of base stations are coordinated with each other to transmit a data signal using a shared channel to a mobile station.

For example, CoMP transmits a shared channel PDSCH having the same signal component from a pico base station and a macro bases station to a specific pico mobile station. In other words, a signal from an adjacent macrocell is received as a desired signal by the pico mobile station, thereby reducing inter-cell interference.

For example, for the shared channel PDSCH, ICIC allocates a specific RB to the shared channel of a mobile station at a cell boundary in the pico base station. The macro base station does not transmit the shared channel with the RB or transmits the shared channel with low transmission power, thereby reducing inter-cell interference.

However, it is difficult to adopt the inter-cell interference coordination control technologies such as CoMP and ICIC for control channels such as the PDCCH. This is because, for control channels, the condition of the number of modulation symbols or the cell ID differs between adjacent cells as already described with reference to Formula 1, and thus the rule of sorting in the interleaving processing differs. Thus, for control channels, the mapping positions of the PDCCH are not the same between the adjacent cells, and are scattered across the entire system bandwidth. As a result, it is difficult to adopt the inter-cell interference coordination technologies such as CoMP and ICIC.

Figure 5:
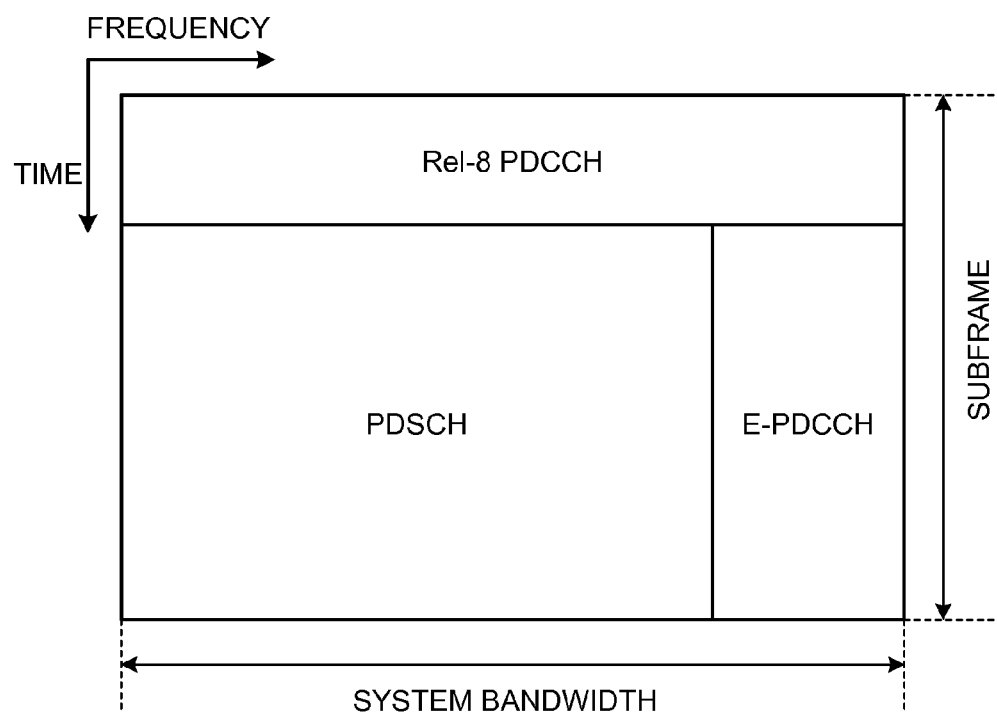
FIG. 5 is a diagram illustrating an example of an E-PDCCH by an FDM approach.

Meanwhile, in LTE, in order to solve the recent shortage of the capacity of the control channel, a concept of a Frequency Division Multiplexing (FDM) approach is developed that enhances the control channel to a predetermined region such as the shared channel region. FIG. 5 is a diagram illustrating an example of an E-PDCCH by the FDM approach. For example, as illustrated in FIG. 5 the FDM approach frequency-multiplexes the PDCCH as one of the control channels to an RB of the PDSCH as the shared channel, thereby enhancing the PDCCH. The enhanced PDCCH is called E-PDCCH below.

Described next is a problem with the E-PDCCH. Also in the E-PDCCH as the control channel enhanced to a predetermined region such as the shared channel, it is desirable to adopt the inter-cell coordination control such as CoMP and ICIC as is the case with the PDSCH as the shared channel in view of reducing inter-cell interference. However, in the E-PDCCH, as is the case with the conventional PDCCH, the mapping positions of the E-PDCCH are not the same between adjacent cells and are arranged in a scattered manner across the entire of an allocated bandwidth, making it difficult to adopt the inter-cell coordination control such as CoMP and ICIC. As a result, control signals using the E-PDCCH may interfere with each other between cells.

In view of the above circumstances, using the wireless communication system according to the present embodiment, a transmission method for the E-PDCCH thereby solves the above-described problem.

First Embodiment

Figure 6:
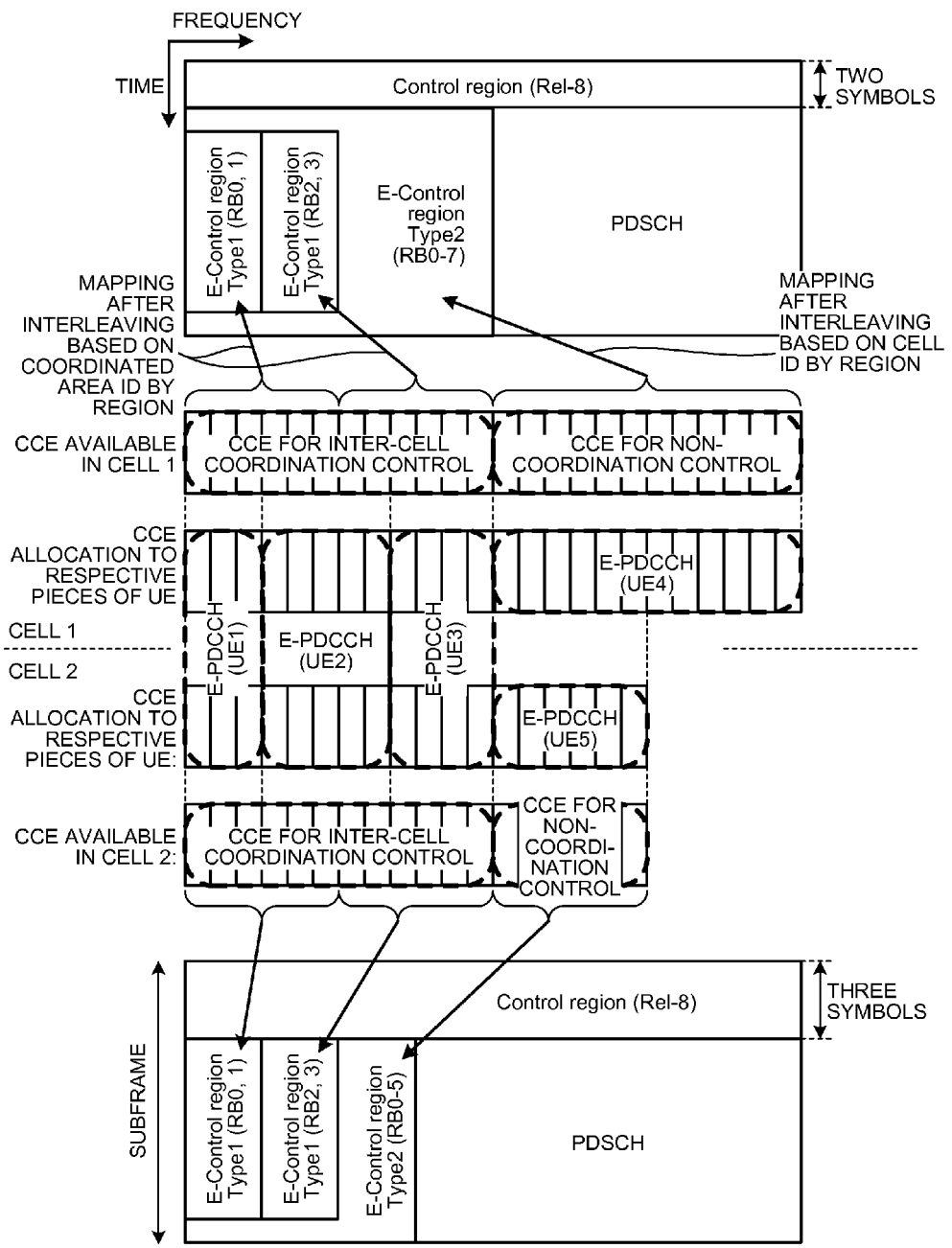
FIG. 6 is a diagram used for describing a wireless communication method in a wireless communication system according to a first embodiment.

Described first is a wireless communication method in a wireless communication system according to a first embodiment. FIG. 6 is a diagram used for describing the wireless communication method in the wireless communication system according to the first embodiment. The wireless communication system according to the present embodiment is configured as a heterogeneous network in which the macrocell and the picocells are arranged in a coexisting manner as illustrated in FIG. 1. The wireless communication system according to the present embodiment can exchange information needed for performing the inter-cell coordination control such as CoMP and ICIC. The range of cells within which inter-cell coordination control can be performed is called a coordinated area below. A coordinated area ID is defined that is a common identifier between the macro base station and the pico base station that belong to the coordinated area. This coordinated area ID is an example of the common identifier.

FIG. 6 illustrates, in two cells (a cell 1 and a cell 2) within a coordinated area, a situation in which CCEs are allocated to E-PDCCHs for respective mobile stations (UE: user equipment) and a situation in which the respective CCEs are mapped to time and frequency resources. It is assumed that, for example, the cell 1 is a picocell, and the cell 2 is a macrocell.

Two types of areas, namely, an E-Control region Type1 and an E-Control region Type2 are provided as time and frequency resources for the E-PDCCH. Among these, the E-Control region. Type1 is a resource for use in inter-cell coordination control and is provided in units of a predetermined number of RBs. In the example of FIG. 6, two E-Control regions Type1 that are made up of respective two RB units are provided. These two E-Control regions Type1 are provided at positions common to the cells within the coordinated area.

The E-Control region Type2 is a resource that is not used for inter-cell coordination control. The E-Control region Type2 is for example, provided in units of the number of RBs that differs by cell in accordance with the number of mobile stations or the like. The E-Control region Type1 and the E-Control region Type2 have REGs as components as is the case with the Release 8 Control region. Described below are specific arrangement examples of these E-Control regions.

CCEs for inter-cell coordination control and CCEs for non-coordination control are provided as CCEs for the E-PDCCH. As is the case with Release 8 PDCCH, one CCE corresponds to nine REGs.

First in a mobile station connected to the pico base station, a situation is assumed in which a desired signal from the pico base station receives an interference signal from the macro base station. In this situation, the pico base station and the macro base station allocate common, CCEs within the CCEs for inter-cell coordination control to the mobile station connected to the pico base station in the respective cells within the coordinated area. In the example of FIG. 6, the pico base station and the macro base station allocate the common CCEs within the CCEs for inter-cell coordination control to a mobile station UE1, a mobile station UE2, and a mobile station UE3 in the cell 1 and the cell 2 within the coordinated area.

A situation is assumed in which a desired signal from the pico base station is not receiving any interference signal from the macro base station. In this situation, the pico base station and the macro base station allocate the CCEs for non-coordination control to the mobile station in a serving cell of the mobile station. In the example of FIG. 6, the pico base station allocates the CCEs for non-coordination control to a mobile station UE4 in the cell 1 as the serving cell of the mobile station UE4, and the macro base station allocates the CCEs for non-coordination control to a mobile station UE5 in the cell 2 as the serving cell of the mobile station UE5.

Next, the resources for E-PDCCH of the respective CCEs are QPSK modulated, then subjected to interleaving processing in units of four modulation symbols, and mapped to the respective REGs of the E-Control regions. Specifically, when the CCEs are the CCEs for non-coordination control, the pico base station and the macro base station block-interleave the QPSK-modulated E-PDCCH in units of four modulation symbols and perform cyclic shift based on the cell ID in units of four modulation symbols. When the CCEs are the CCEs for inter-cell coordination control, the pico base station and the macro base station perform interleaving processing in units of the RB of the E-Control region Type1. For example it is assumed that one E-Control region Type1 includes 22 REGs. In this case, the Pico base station and the macro base station cut 22 units of four modulation symbols out of the CCEs for inter-cell coordination control, perform block interleaving in units of four modulation symbols, and perform cyclic shift based on the coordinated area ID in units of four modulation symbols.

Thus, for example, for the E-PDCCHs for the UE1, the UE2, and the UE3 in the diagram, CCEs common to the respective cells are allocated. Block interleaving is performed in units of processing common to the respective cells. Cyclic shift based on the coordinated area ID as the identifier common to the respective cells is performed. After that, the resources for E-PDCCH are mapped to the REGs within the E-Control region Type1 as the time and frequency resources common to the respective cells. Consequently, a control channel E-PDCCH having the same signal component can be transmitted from the pico base station and the macro base station to a specific mobile station. This can improve the reception characteristics of the E-PDCCH.

For example, for the E-PDCCHs for the UE4 and the UE5 in the diagram, CCEs are allocated in the serving cell. Because the CCEs are commonly used between the cells, E-PDCCHs for a larger number of mobile stations are accommodated.

Figure 7:
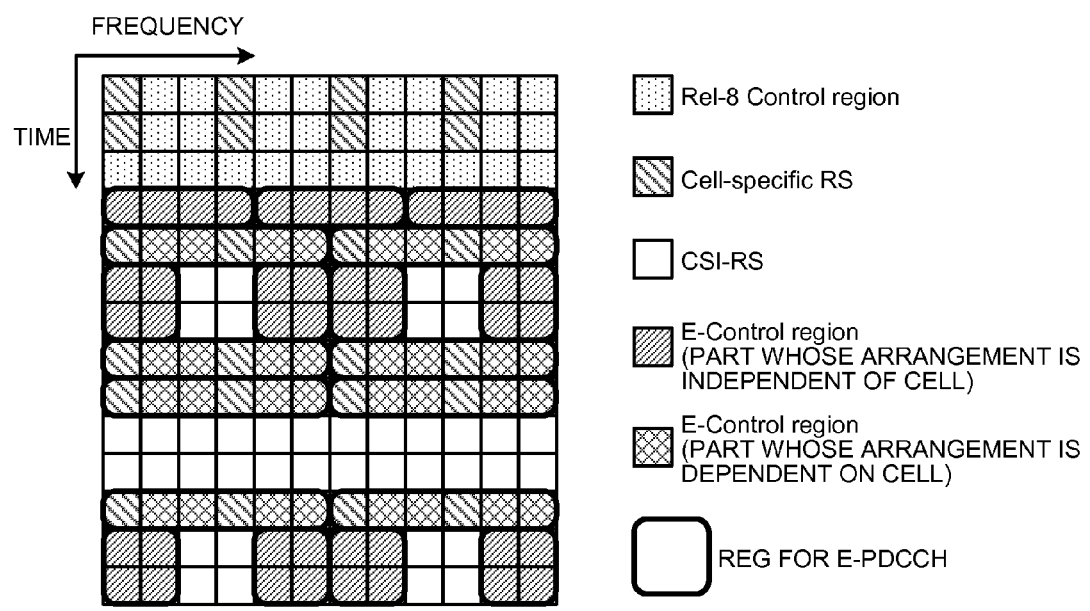
FIG. 7 is a diagram illustrating an arrangement example (Part 1) of an E-Control region in the first embodiment.
Figure 8:
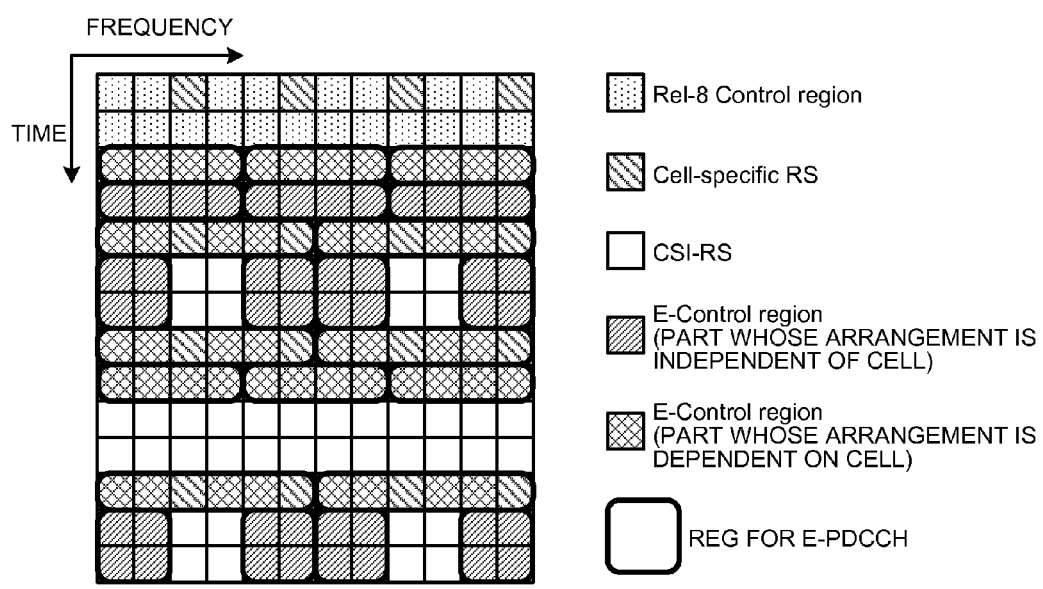
FIG. 8 is a diagram illustrating an arrangement example (Part 2) of the E-Control region in the first embodiment.

Described here are specific arrangement examples of the E-control region. FIG. 7 is a diagram illustrating an arrangement example (Part 1) of the E-Control region in the first embodiment. FIG. 8 is a diagram illustrating an arrangement example (Part 2) of the E-Control region in the first embodiment. FIG. 7 illustrates a situation in which the number of transmission antennas is four, and three OFDM symbols are used as the Release 8 Control region. FIG. 8 illustrates a situation in which the number of transmission antennas is two, and two OFDM symbols are used as the Release 8 Control region.

As illustrated in FIG. 7 and FIG. 6, for Cell-specific RS, the number of REs used differs in accordance with the number of transmission antennas, and the mapping position shifts in the frequency domain in accordance with the cell ID. For Channel State Information (CSI)-RS as a reference signal for channel quality measurement, REs used are limited to a part of the REs drawn in the diagram, and patterns of a transmission period and the like are set by a higher layer. As a result, there are REGs whose mapping positions are independent of the cell among REs that are not used by the other physical channels. The REGs whose mapping positions are independent of the cell are used as the E-Control region Type1 and the E-Control region Type2. There are also REGs whose mapping positions are dependent on the cell among REs that are not used by the other physical channels. The REGs whose mapping positions are dependent on the cell are used as the E-Control region Type2.

The configuration of the E-Control region may adopt a predetermined configuration set in advance within the wireless communication system. The configuration of the E-Control region may be a configuration switched by the base stations within the wireless communication system as needed. When the base stations within the wireless communication system switch the configuration of the E-Control region, the base station reports E-Control region configuration information indicating the configuration of the E-Control region to a mobile station. The E-Control region configuration information includes, for example, information on the position of RBs used as the E-Control region and information on the unit bandwidth (e.g., a unit bandwidth of two RBs) of the E-Control region Type1. Further included is information indicating whether REGs whose mapping positions are independent of the cell among REGs for the E-PDCCH are used as the E-Control region Type1.

Figure 9:
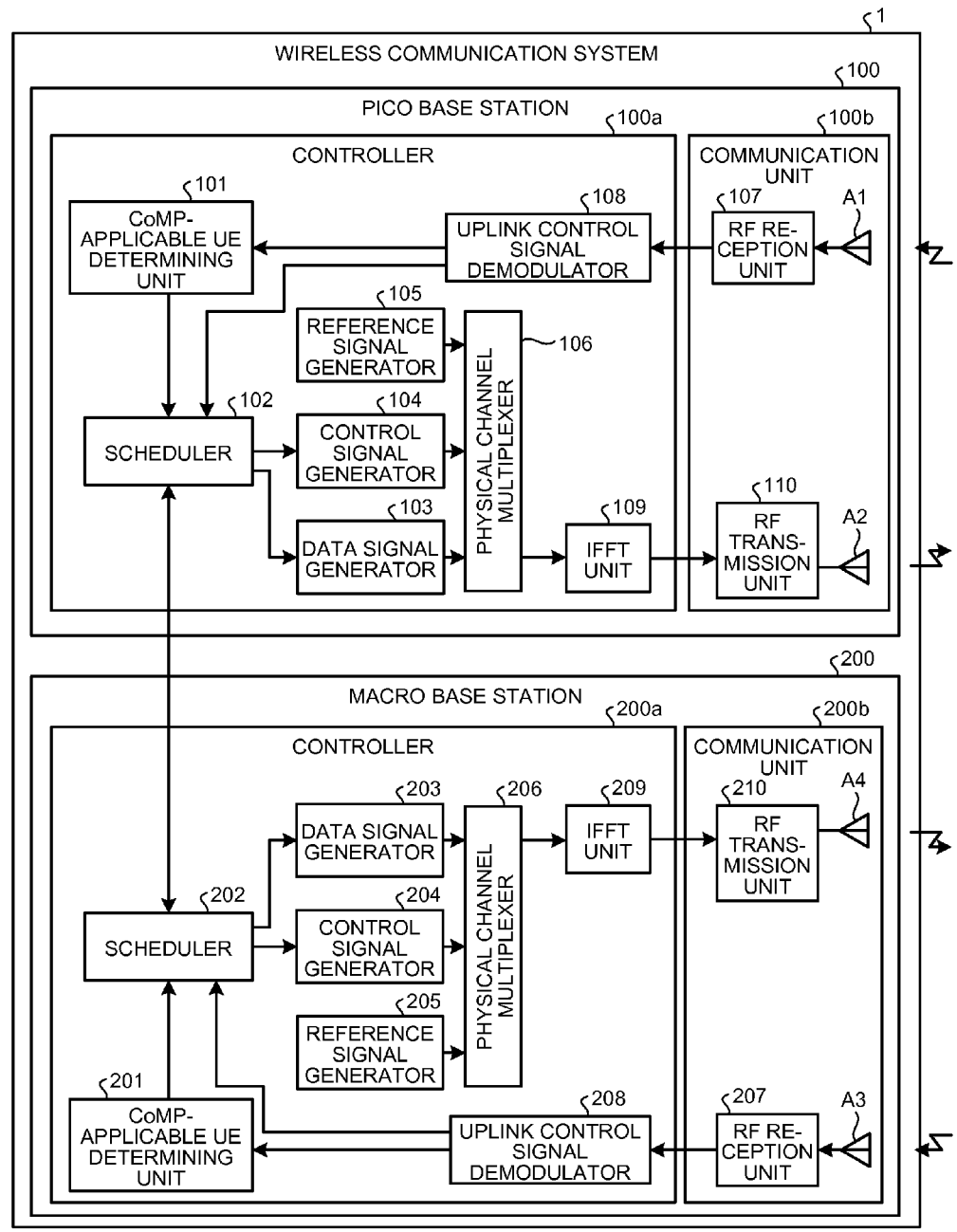
FIG. 9 is a diagram illustrating the configuration of the wireless communication system according to the first embodiment.

Described next is the configuration of the wireless communication system according to the present embodiment. FIG. 9 is a diagram illustrating the configuration of the wireless communication system according to the first embodiment. As illustrated in FIG. 9, this wireless communication system 1 includes a pico base station 100 and a macro base station 200. It is assumed that the pico base station 100 and the macro base station 200 are base stations that belong to a coordinated area.

The pico base station 100 includes a controller 100a and a communication unit 100b. The controller 100a includes a CoMP-applicable UE determining unit 101, a scheduler 102, and a data signal generator 103. The controller 100a also includes a control signal generator 104, a reference signal generator 105, a physical channel multiplexer 106, an uplink control signal demodulator 108, an inverses fast Fourier transform (IFFT) unit 109. The communication unit 100b includes a radio frequency (RF) reception unit 107 and an RF transmission unit 110. These components are connected so that signals and data can be input and output unidirectionally or bidirectionally. Physically, the controller 100a is made no of a digital circuit, a digital signal processor (DSP), a central processing unit (CPU), and the like, and the communication unit 100b is made up of an analog circuit including amplifiers and filters and the like.

The CoMP-applicable UE determining unit 101 determines, based on information on the received power (reference signal received power (RSRP)) of the respective cells reported from the respective mobile stations, whether the mobile station is a CoMP-applicable UE and determines a coordination cell. The coordination cell is a cell on which CoMP as one piece of the inter-cell coordination control can be performed. The CoMP-applicable UE determining unit 101 reports to the scheduler 102 the information indicating whether the mobile station is a CoMP-applicable UE and the information on the coordination cell as CoMP-applicable UE information.

The scheduler 102 performs user scheduling based on the CoMP-applicable UE information and channel quality indicators (CQIs) reported from the respective mobile stations. For example, the scheduler 102 allocates frequency resources to the shared channels for the respective mobile stations and allocates CCEs to the E-PDCCHs for the respective mobile stations based on the CoMP-applicable UE information and the CQIs reported from the respective mobile stations. In order to perform inter-cell coordinated user scheduling, the scheduler 102 exchanges user data, control data, and scheduling information on the CoMP-applicable UE with a scheduler 202 of the macro base station 200 that accommodates the coordination cell. This exchange is performed through a wired interface.

The data signal generator 103 generates a data signal of the PDSCH or the like based on the user data, a search space switching instruction described below, the E-Control region configuration information, and the like. The control signal generator 104 generates a control signal of the E-PDCCH or the like based on control information made up of resource allocation information and the like. The reference signal generator 105 generates a reference signal.

The physical channel multiplexer 106 frequency multiplexes the physical channels. For example, the physical channel multiplexer 106 block-interleaves the E-PDCCHs of the respective CCEs among the physical channels in units of four modulation symbols and performs cyclic shift based on the coordinated area ID in units of four modulation symbols, thereby frequency-multiplexing the E-PDCCHs.

The RF reception unit 107 performs conversion from a radio frequency to a baseband, orthogonal demodulation, and analog to digital (A/D) on an uplink reception signal. The RF reception unit 107 has an antenna A1 and receives an uplink signal. The uplink control signal demodulator 108 performs demodulation on an uplink control signal and restores the CQI as the control information and the RSRP of the respective cells. The IFFT unit 109 performs inversed fast Fourier transform (IFFT) and adds a cyclic prefix (CP). The RF transmission unit 110 performs D/A conversion and orthogonal modulation, performs conversion from a baseband into a radio frequency, and transmits a downlink signal with power amplified. The RF transmission unit 110 has an antenna A2 and transmits a downlink signal.

Similarly, the macro base station 200 includes a controller 200a and a communication unit 200b. The controller 200a includes a CoMP-applicable UE determining unit 201, the scheduler 202, and a data signal generator 203. The controller 200a also includes a control signal generator 204, a reference signal generator 205, a physical channel multiplexer 206, an uplink control signal demodulator 209, an inversed fast Fourier transform (IFFT) unit 209. The communication unit 200b includes an RF reception unit 207 and an RF transmission unit 210. These components are connected so that signals and data can be input and output unidirectionally or bidirectionally. Physically, the controller 200a is made up of a digital circuit, a digital signal processor (DSP), a central processing unit (CPU, and the like, and the communication unit 200b is made up of an analog circuit including amplifiers and filters and the like.

The macro base station 200 has a similar configuration to the pico base station 100. Accordingly, similar components are given reference numerals with the same ends, and detailed description thereof is omitted.

Figure 10:
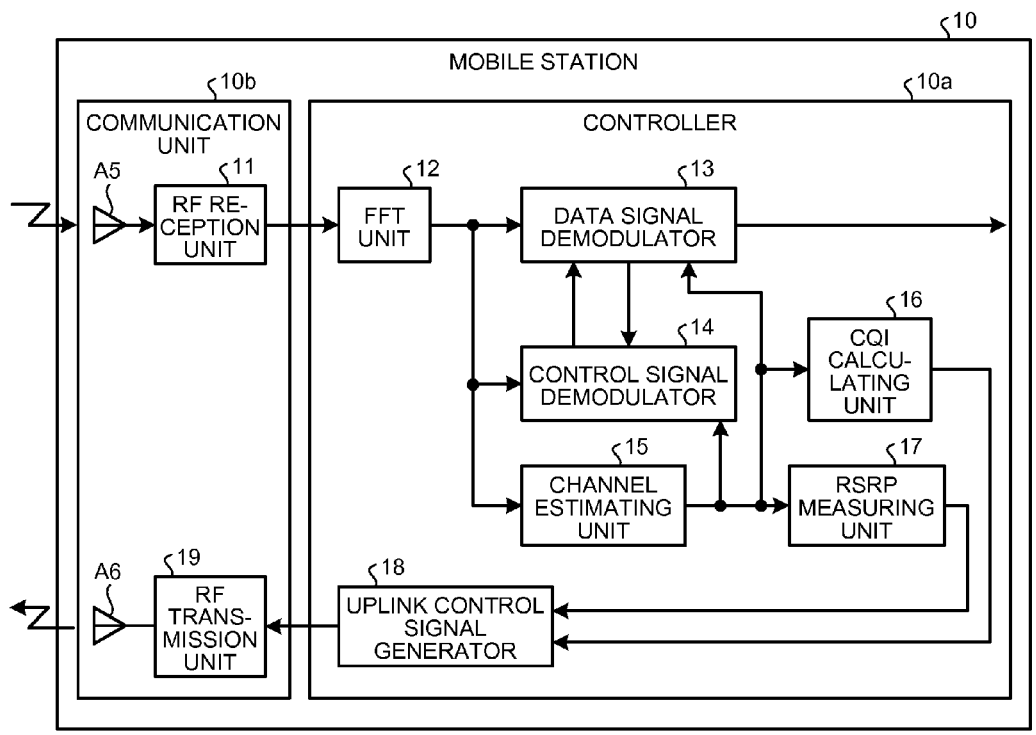
FIG. 10 is a diagram illustrating the configuration of a mobile station according to the first embodiment.

Described next is the configuration of a mobile station 10. FIG. 10 is a diagram illustrating the configuration of a mobile station according to the first embodiment. The mobile station 10 includes a controller 10a and a communication unit 10b. The controller 10a includes an FFT unit 12, a data signal demodulator 13, a control signal demodulator 14, a channel estimating unit 15, a CQI calculating unit 16, an RSRP measuring unit 17, and an uplink control signal generator 18. The communication unit 10b includes an RF reception unit 11 and an RF transmission unit 19. These components are connected so that signals and data can be input and output unidirectionally or bidirectionally.

The RF reception unit 11 performs conversion from a radio frequency to a baseband, orthogonal demodulation, and A/D conversion on a downlink reception signal. The RF reception unit 11 receives a downlink signal by an antenna A5. The FFT unit 12, as is the case with the typical OFDM method, detects the cut-out timing of the reception signal, removes a CP, and then converts the detection result into a reception signal in the frequency domain by the fast Fourier transform (FFT).

The data signal demodulator 13, based on the resource allocation information, demodulates a data signal extracted from the reception signal and restores data information. The data information includes, in addition to the user data, control information from the higher layer such as the search space switching instruction and the E-Control region configuration information. When having restored the search space switching instruction as the data information, the data signal demodulator 13 reports the restored search space (SS) switching instruction to the control signal demodulator 14.

The control signal demodulator 14 demodulates the control signal of E-PDCCH extracted from the reception signal or the like and restores the resource allocation information as the control information. When the SS switching instruction has been reported from the data signal demodulator 13, the control signal demodulator 14 switches the range to be searched for when decoding the E-PDCCH.

The channel estimating unit 15 takes correlation between the reference signal extracted from the reception signal and a replica of a known reference signal to obtain a channel estimated value. This channel estimation is performed not only on a cell to which the mobile station 10 is connected, but also on its neighboring cells. The CQI calculating unit 16 calculates the channel quality information (the above CQI) using the channel estimated value of the cell to which the mobile station 10 is connected. The RSRP measuring unit 17 measures the reception power (the above RSRP) of the reference signals of the respective cells using the channel estimated values of the cell to which the mobile station 10 is connected and the neighboring cells. The uplink control signal generator 18 generates an uplink control signal based on control information made up of the CQI and the RSRP of the respective cells. The RF transmission unit 19 performs digital to analog (D/A) conversion and orthogonal modulation, performs conversion from a baseband into a radio frequency, and transmits an uplink signal with power amplified. The RF transmission unit 19 transmits an uplink signal from an antenna A6. Physically, the controller 10a is made up of a digital circuit, a DSP, a CPU, and the like, and the communication unit 10b is made up of an analog circuit including amplifiers and filters and the like.

Figure 11:
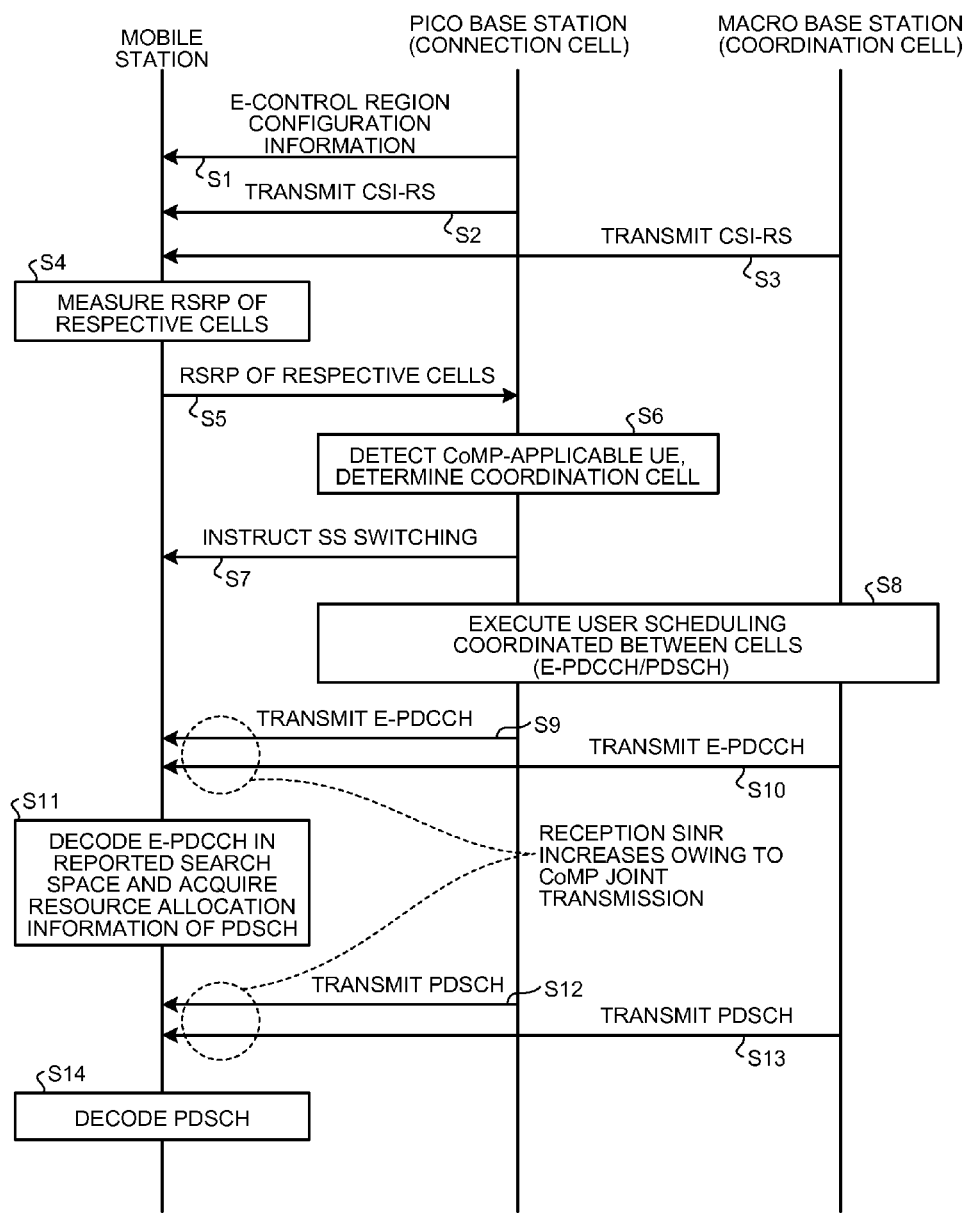
FIG. 11 is a diagram illustrating the operation of the wireless communication system according to the first embodiment.

Described next is operation. The present embodiment assumes a network environment in which a plurality of picocells coexist in a macrocell as illustrated in FIG. 1. FIG. 11 is a diagram illustrating the operation of the wireless communication system 1 according to the first embodiment. The following assumes that the mobile station 10 is connected to the pico base station 100, and that the pico base station 100 and the macro base station 200 that belong to a coordinated area hold a common coordinated area ID. The following may call a picocell to which the mobile station 10 is connected a serving cell.

At S1, the pico base station 100 reports to the mobile station 10 the E-Control region configuration information. The mobile station 10 that has received the E-Control region configuration information specifies the arrangement of the E-control region Type1 and the E-control region Type2 to which CCEs are mapped.

At S2, the pico base station 100 transmits the CSI-RS. At S3, the macro base station 200 transmits the CSI-RS. At S4, the mobile station 10 measures the reception power of the CSI-RS for the picocell to which it is connected audits neighboring cells. The neighboring cells include the cells within the coordinated area. At S5, the mobile station 10 reports to the pico base station 100 the measurement result of the reception power as the RSRP.

At S6, the pico base station 100 estimates the state of inter-cell interference in the mobile station 10 based on the RSRP of the respective cells reported from the mobile station 10 and detects the CoMP-applicable UE and determines the coordination cell based on the estimation result. For example, when RSRP of the picocell to which the mobile station 10 is connected is "RSRP_S" and RSRP of the respective cells within the coordinated area including the macrocell is "RSRP_I," the difference α=|RSRP_S−RSRP_I| represents the state of inter-cell interference in the mobile station 10. Given this situation, when there exists any cell whose α is a predetermined threshold or less among the cells in the coordinated area, the pico base station 100 detects the mobile station 10 connected to the picocell as the CoMP-applicable UE and determines the cell whose α is the threshold or less as the coordination cell. It is assumed in the present embodiment that the pico base station 100 has determined the macrocell as the coordination cell.

At S7, the pico base station 100 reports to the mobile station 10 the SS switching instruction that instructs the switching of the search space (SS) searched by the mobile station 10 when decoding the E-PDCCH.

Figure 12:
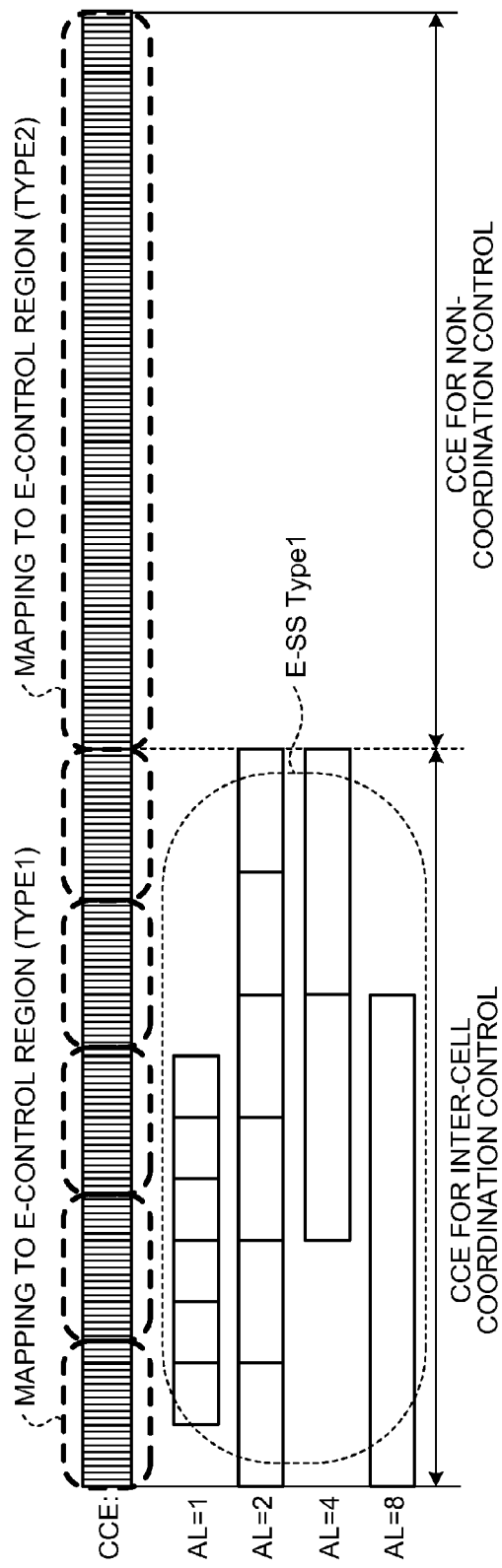
FIG. 12 is a diagram illustrating an example of an E-SS Type1 in the first embodiment.
Figure 13:
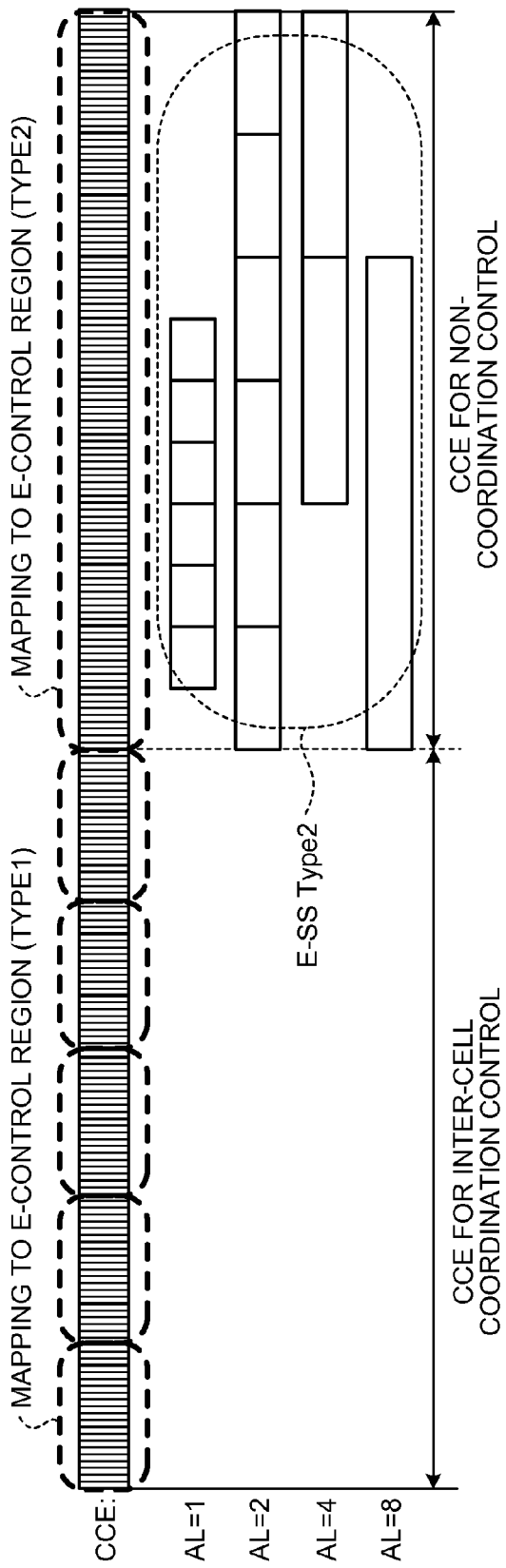
FIG. 13 is a diagram illustrating an example of an E-SS Type2 in the first embodiment.

Described here is specific processing performed by the pico base station 100 at S7. As illustrated in FIG. 12 and FIG. 13, the SS searched by the mobile station 10 when decoding E-PDCCH includes Enhanced (E)-SS Type1 as an SS defined on the CCEs for inter-cell coordination control and E-SS Type2 as an SS defined on the CCEs for non-coordination control. When the mobile station 10 is the CoMP-applicable UE, the pico base station 100 reports to the mobile station 10 an SS switching instruction that instructs the switching of the current SS to the E-SS Type1 illustrated in FIG. 12. In contrast, when the mobile station 10 is not the CoMP-applicable UE, the pico base station 100 reports to the mobile station 10 an SS switching instruction that instructs the switching of the current SS to the E-SS Type2 illustrated in FIG. 13. FIG. 12 is a diagram illustrating an example of the E-SS Type1 in the first embodiment. FIG. 13 is a diagram illustrating an example of the E-SS Type2 in the first embodiment.

Returning back to FIG. 11, at S8, the pico base station 100 and the macro base station 200 perform user scheduling in coordination with each other.

Figure 14:
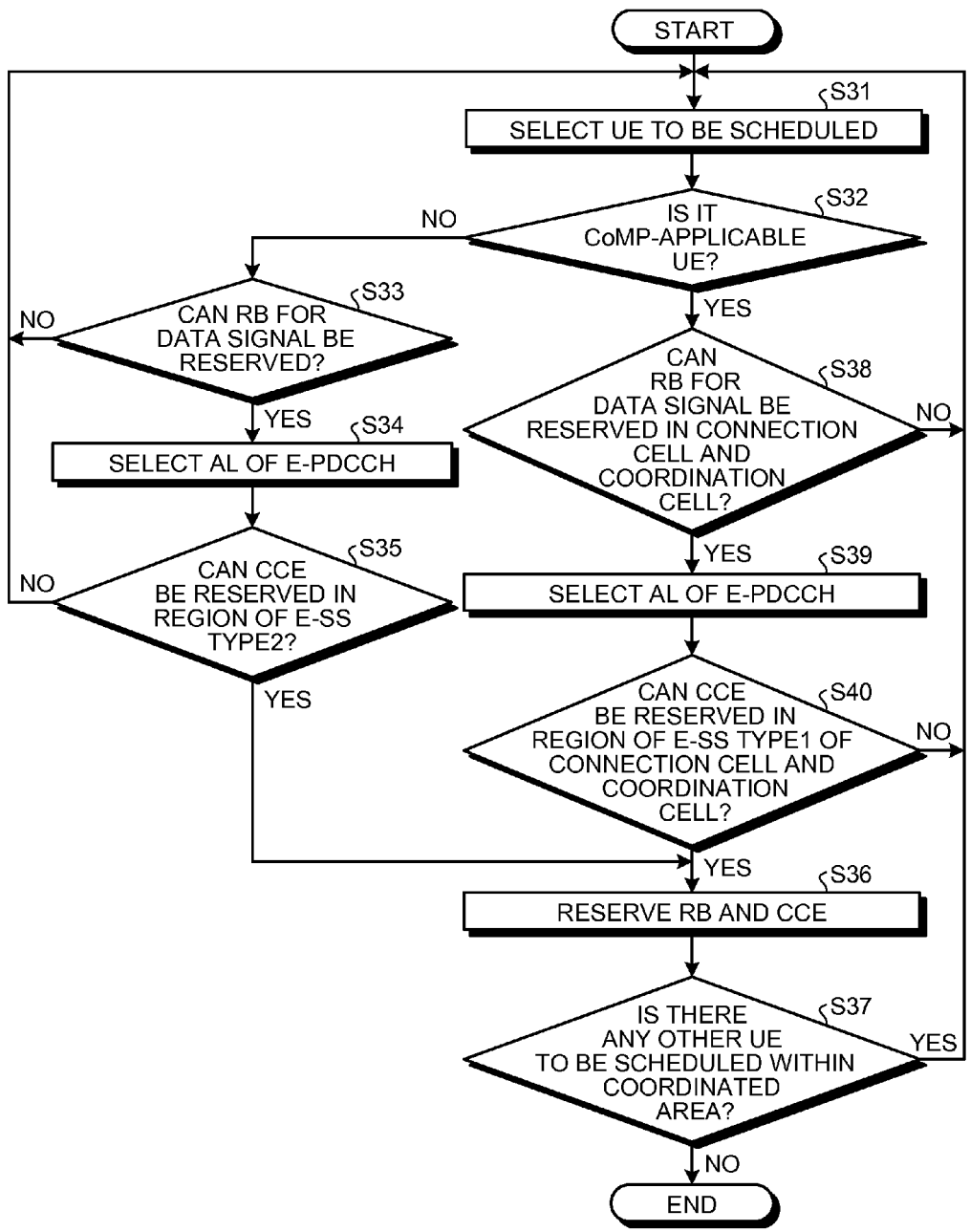
FIG. 14 is a diagram used for describing a user scheduling algorithm of a pico base station and a macro base station according to the first embodiment.

FIG. 14 is a diagram used for describing a user scheduling algorithm of the pico base station 100 and the macro base station 200 performed at S8 according to the first embodiment. Because the pico base station 100 and the macro base station 200 perform the same user scheduling with respect to its processing contents, described here are the processing contents of the pico base station 100 as a representative.

First, when the pico base station 100 selects UE to be scheduled (S31), it is determined whether the UE selected at S31 is the CoMP-applicable UE (S32).

As a result of the determination at S32, if the UE selected at S31 is not the CoMP-applicable UE (No at S32), the pico base station 100 determines whether an RB for a data signal can be reserved (S33). As a result of the determination, if the RB can be reserved (Yes at S33), the pico base station 100 selects an AL of the E-PDCCH (S34) and determines whether a CCE for the E-PDCCH can be reserved in the region of the E-SS Type2 of the serving cell (S35). As a result of the determination, if the CCE can be reserved (Yes at S35), the pico base station 100 reserves the RB for the data signal and the CCE for the E-PDCCH (S36). In this situation, the pico base station 100 reserves the RB for the data signal and the CCE for the E-PDCCH based on its own cell ID. After that, the pico base station 100 searches for another UE to be scheduled within the coordinated area (S37), and if there is no other UE (No at S37), ends the user scheduling processing.

As a result of the determination at S32, if the UE selected at S31 is the CoMP-applicable UE (Yes at S32), the pico base station 100 determines whether the RB for the data signal can be reserved in the serving cell and the coordination cell (S38). As a result of the determination, if the RB for the data signal can be reserved (Yes at S38), the pico base station 100 selects an AL of the E-PDDCH (S39) and determines whether the CCE for the E-PDCCH can be reserved in the region of the E-SS Type1 of the serving cell and the coordination cell (S40). As a result of the determination, if the CCE can be reserved (Yes at S40), the pico base station 100 reserves the RB for the data signal and the CCE for the E-PDCCH (S36). In this situation, the pico base station 100, based on the coordinated area ID, reserves the RB for the data signal and the CCE for the E-PDCCH at a position common to the region of the E-SS Type1 of the serving cell and the coordination cell.

If it is determined that the RB is not reserved at S33 or S38 (No at S33 or No at S38), the process returns back to S31, and the processing at S31 and the subsequent processing are performed again. If it is determined that the CCE is not reserved at S35 or 340 (No at S35 or No at S40), similarly the process returns back to S31, and the processing at S31 and the subsequent processing are performed again.

A series of processing from S31 to S40 is performed repeatedly until no UE to be scheduled is present (Yes at S37), at ends when scheduling processing is completed for all UE.

Returning back to FIG. 11, at S9, the pico base station 100 transmits to the mobile station 10 as the CoMP-applicable UE the same E-PDCCH as the macro base station 200 using the CCE for the E-PDCCH at a position common to the region of the E-SS Type1 of the serving cell and the coordination cell.

At S10, the macro base station 200 transmits to the mobile station 10 as the CoMP-applicable UE the same E-PDCCH as the pico base station 100 using the CCE for the E-PDCCH at a position common to the region of the E-SS Type1 of the serving cell and the coordination cell. The E-PDCCH transmitted at S9 and the E-PDCCH transmitted at S10 are combined on a wireless channel and reach the receiving antenna of the mobile station 10 with a signal to interference noise ratio (SINR) improved. This reduces interference on the E-PDCCH of the CoMP-applicable UE in the picocell from the macrocell.

The pico base station 100 transmits to the mobile station 10 not as the CoMP-applicable UE the E-PDCCH using the CCE in the region of the E-SS Type2.

At S11, the mobile station 10 performs the switching of the SS in accordance with the SS switching instruction reported from the pico base station 100 at S7 and searches the SS after switching to decode the E-PDCCH. Specifically, the mobile station 10 as the CoMP-applicable UE switches the current SS to the E-SS Type1 and searches the E-SS Type1 to decode the E-PDCCH. The mobile station 10 not as the CoMP-applicable UE switches the current SS to the E-SS Type2 and searches the E-SS Type2 to decode the E-PDCCH. The mobile station 10 acquires the resource allocation information of the PDSCH from the decoded. E-PDCCH.

At S12, the pico base station 100 transmits to the mobile station 10 as the CoMP-applicable UE the same PDSCH as the macro base station 200 using the allocated RB at the common position.

At S13, the macro base station 200 transmits to the mobile station 10 as the CoMP-applicable UE the same PDSCH as the pico base station 100 using the allocated RB at the common position. The PDSCH transmitted at S12 and the PDSCH transmitted at S13 are combined on the wireless channel and reach the receiving antenna of the mobile station 10 with the SINR improved. This reduces interference on the PDSCH of the CoMP-applicable UE in the picocell from the macrocell.

The pico base station 100 transmits to the mobile station 10 not as the CoMP-applicable UE the PDSCH using the allocated RB.

At S14, the mobile station 10 decodes the PDSCH mapped to the RB indicated by the resource allocation information acquired at S11 to obtain user data.

As described above, the wireless communication system 1 according to the first embodiment performs inter-cell coordination control that coordinates the pico base station 100 and the macro base station 200 with each other and transmits a signal to the mobile station 10 of the picocell. The wireless communication system 1 includes the pico base station 100, the macro base station 200, and the mobile station 10 of the picocell. The pico base station 100 includes a controller 100a and a communication unit 100b. The controller 100a interleaves resources of the PDCCH of the picocell corresponding to a predetermined resource unit based on the coordinated area ID that is an identifier common to the pico base station 100 and the macro base station 200. The communication unit 100b transmits a control signal to the mobile station 10 of the picocell using the first resource of the E-PDCCH of the picocell that corresponds to at least a part of the predetermined resource unit and is to be decoded by the mobile station 10 of the picocell. The macro base station 200 includes a controller 200a and a communication unit 200b. The controller 200a interleaves resources of the E-PDCCH of the macrocell corresponding to the predetermined resource unit based on the coordinated area ID. The communication unit 200b transmits a control signal to the mobile station 10 of the picocell using the second resource of the E-PDCCH of the macrocell that corresponds to at least a part of the predetermined resource unit and is to be decoded by the mobile station 10 of the picocell. The mobile station 10 of the picocell includes a communication unit 10b that receives the control signal transmitted from the pico base station using the first resource and receives the control signal transmitted from the macro base station 200 using the second resource. The predetermined resource unit is one or more RBs. The first resource is a search space (SS) unique to the mobile station 10 of the picocell, which includes, for example, the E-SS Type1 as an SS defined on the CCEs for inter-cell coordination control and the E-SS Type2 as an SS defined on the CCEs for non-coordination control. This causes the wireless communication system 1 to reduce the inter-cell interference of the E-PDCCH.

Second Embodiment

Described in a second embodiment is an example of adopting the technology of ICIC to the wireless communication system in the first embodiment. Specifically, the scheduler 102 of the pico base station 100 and the scheduler 202 of the macro base station 200 in the first embodiment reserve CCEs for the E-PDCCH at a position common to the areas of the E-SS Type1 of the serving cell and the coordination cell. This allows the E-PDCCH having the same signal component to be transmitted from the pico base station and the macro base station using all resources of the CCE for inter-cell coordination control reserved as the CCE for the E-PDCCH and can reduce the inter-cell interference of the E-PDCCHs. On the other hand, however, because control information to be transmitted is exchanged between the base stations, high speed control is needed.

The wireless communication system according to the present embodiment performs inter-cell coordination control that reduces the inter-cell interference of the E-PDCCH using a relatively simple method. In order to achieve the inter-cell coordination control, one of the schedulers of the pico base station and the macro base station sets the partial region of the CCEs for inter-cell coordination control to be zero or low transmission power, and the other scheduler transmits the E-PDCCH at the region.

Figure 15:
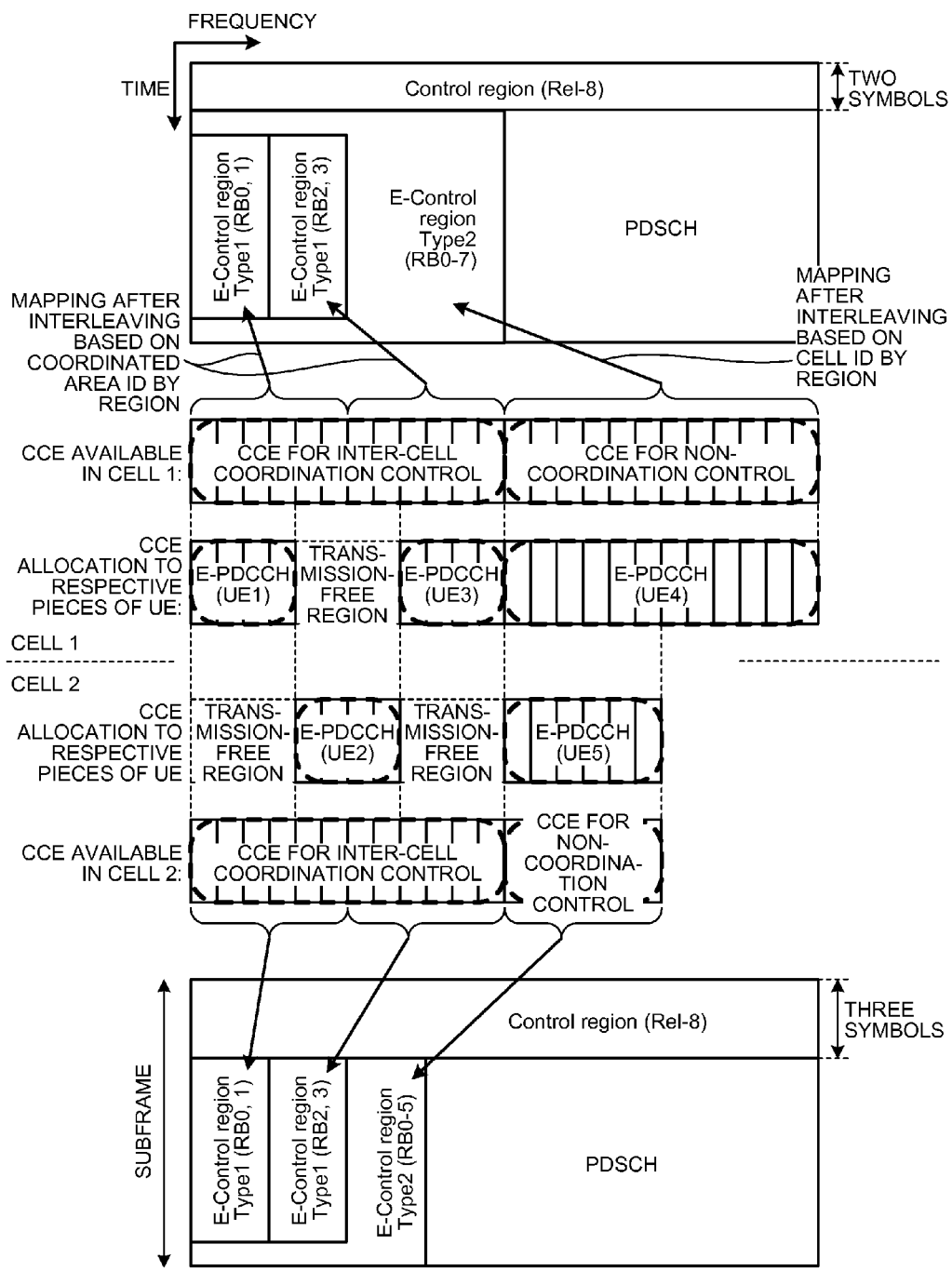
FIG. 15 is a diagram used for describing a wireless communication method in a wireless communication system according to a second embodiment.

Described first is a wireless communication method in the wireless communication system according to the present embodiment. FIG. 15 is a diagram used for describing the wireless communication method using the wireless communication system according to the second embodiment. FIG. 15 illustrates a situation in two cells (a cell 1 and a cell 2) within a coordinated area, in which CCEs are allocated to E-PDCCHs for respective UE and the respective CCEs are mapped to time and frequency resources. It is assumed that, for example, the cell 1 is a picocell, and the cell 2 is a macrocell. Described below are principal differences between the second embodiment and the first embodiment.

First, the pico base station and the macro base station set the transmission power of at least a partial region of the CCEs for inter-cell coordination control to be zero or a value smaller than a current value. The region whose transmission power is thus set to be zero or the value smaller than the current value is called a "transmission free region" below. In the example of FIG. 15, the pico base station sets in the cell 1 four CCEs among the CCEs for inter-cell coordination control as the transmission free region, and the macro station sets in the cell 2 eight CCEs among the CCEs for inter-cell coordination control as the transmission-free region.

The pico base station and the macro base station exchange transmission-free region information indicating the transmission-free regions. In the example of FIG. 15, the pico base station reports to the macro base station information on the position, identification number, and the like of the four CCEs set as the transmission-free region among the CCEs for inter-cell coordination control as transmission-free region information. The macro base station reports to the pico base station information on the position, identification number, and the like of the eight CCEs set as the transmission-free region among the CCEs for inter-cell coordination control as transmission-free region information.

When the transmission-free region of the macro base station indicated by the transmission-free region information reported from the macro base station overlaps with the CCEs for inter-cell coordination control, the pico base station allocates the CCEs in the overlapping region to an E-PDCCH for a mobile station that is on the border with the macrocell as an adjacent cell. In the example of FIG. 15, the pico base station allocates the eight CCEs in the area in which the transmission-free region of the macro base station overlaps with the CCEs for inter-cell coordination control to the mobile stations UE1 and UE3 that are on the border with the cell 2.

When the transmission-free region of the pico base station indicated by the transmission-free region information reported from the pico base station overlaps with the CCEs for inter-cell coordination control, the macro base station allocates the CCEs in the overlapping region to an E-PDCCH for a mobile station that is on the border with the picocell as an adjacent cell. In the example of FIG. 15, the macro base station allocates the four CCEs in the area in which the transmission-free region of the pico base station overlaps with the CCEs for inter-cell coordination control to the mobile station UE2 that is on the border with the cell 1.

This can reduce, for example, interference between the E-PDCCHs for the UE1, the UE2, and the UE3 and the adjacent cells in the diagram.

Figure 16:
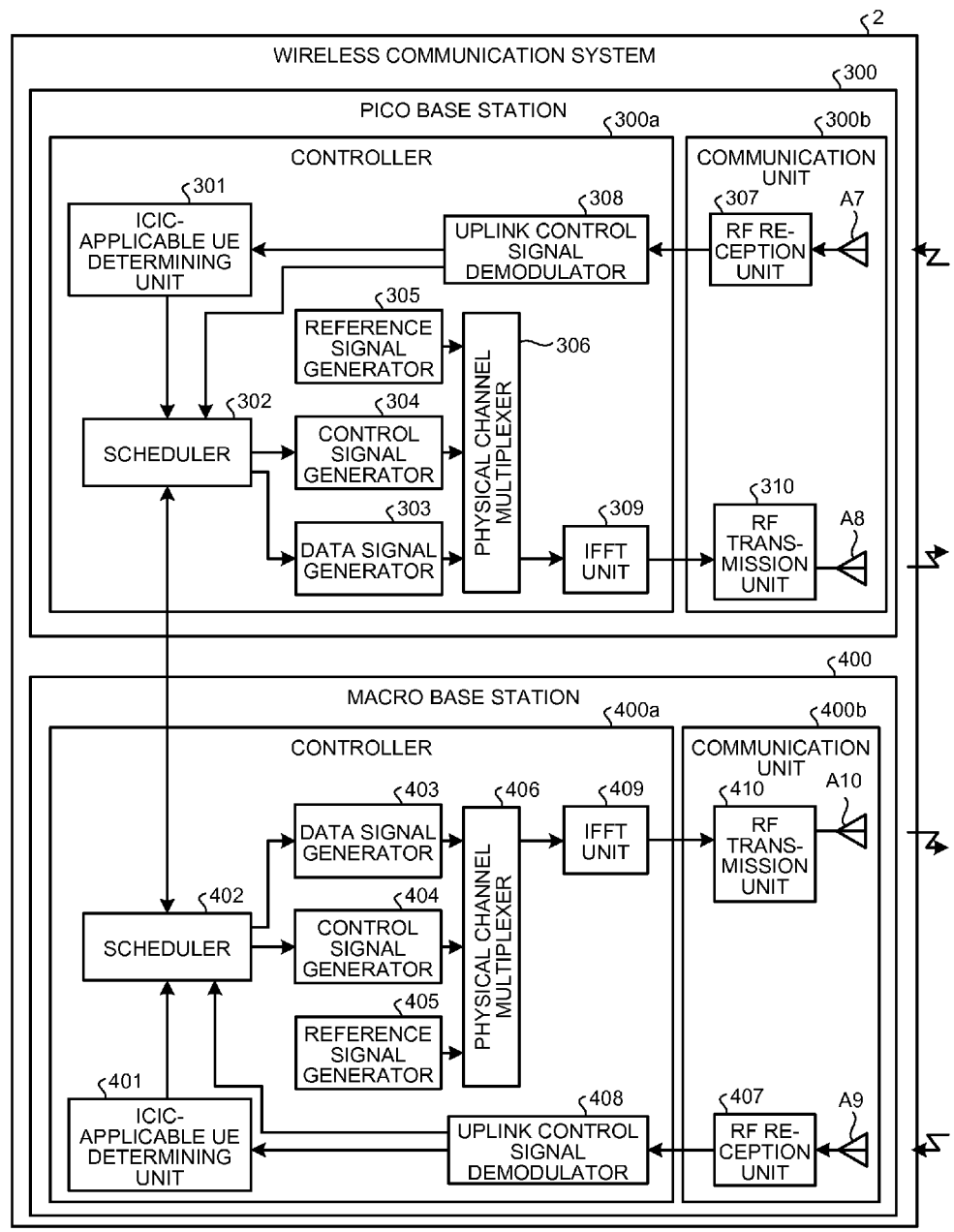
FIG. 16 is a diagram illustrating the configuration of the wireless communication system according to the second embodiment.

Described next is the configuration of the wireless communication system according to the present embodiment. FIG. 16 is a diagram illustrating the configuration of the wireless communication system according to the second embodiment. As illustrated in FIG. 16, this wireless communication system 2 includes a pico base station 300 and a macro base station 400. The pico base station 300 includes a controller 300a and a communication unit 300b. The controller 300a includes an ICIC-applicable UE determining unit 301, a scheduler 302, and a data signal generator 303. The controller 300a includes a control signal generator 304, a reference signal generator 305, a physical channel multiplexer 306, an uplink control signal demodulator 308, and an IFFT unit 309. The communication unit 300b includes an RF reception unit 307 and an RF transmission unit 310. These components are connected so that signals and data can be input and output unidirectionally or bidirectionally.

Similarly, the macro base station 400 includes a controller 400a and a communication unit 400b. The controller 400a includes an ICIC-applicable UE determining unit 401, a scheduler 402, and a data signal generator 403. The controller 400a includes a control signal generator 404, a reference signal generator 405, a physical channel multiplexer 406, an uplink control signal demodulator 408, and an IFFT unit 409. The communication unit 400b includes an RF reception unit 407 and an RF transmission unit 410. These components are connected so that signals and data can be input and output unidirectionally or bidirectionally.

The wireless communication system 2 has a similar configuration to the wireless communication system 1 in the first embodiment. Accordingly, similar components is given reference numerals with the same ends, and detailed description thereof is omitted.

Specifically, the pico base station 300 and the macro base station 400 in the second embodiment are components corresponding to the pico base station 100 and the macro base station 200 in the first embodiment, respectively. The controller 300a and the communication unit 300b of the pico base station 300 correspond to the controller 100a and the communication unit 100b of the pico base station 100, respectively. Similarly, the controller 400a and the communication unit 400b of the macro base station 400 correspond to the controller 200a and the communication unit 200b of the macro base station 200, respectively.

The ICIC-applicable UE determining unit 301, the scheduler 302, and the data signal generator 303 of the pico base station 300 correspond to the CoMP-applicable UE determining unit 101, the scheduler 102, and the data signal generator 103 of the pico base station 100, respectively. The control signal generator 304, the reference signal generator 305, and the physical channel multiplexer 306 correspond to the control signal generator 104, the reference signal generator 105, and the physical channel multiplexer 106, respectively. The uplink control signal demodulator 308 and the IFFT unit 309 correspond to the uplink control signal demodulator 108 and the IFFT unit 109, respectively. The RF reception unit 307 and the RF transmission unit 310 correspond to the RF reception unit 107 and the RF transmission unit 110, respectively.

The macro base station 400 has a similar configuration to the pico base station 300. Accordingly, similar components are given reference numerals with the same ends, and detailed description thereof is omitted. The configuration of a mobile station is similar to that of the first embodiment, and the description thereof is omitted.

Described below are principal differences between the second embodiment and the first embodiment. The ICIC-applicable UE determining unit 301 of the pico base station 300 determines, based on information on the RSRP of respective cells reported from respective mobile stations, whether the mobile station is an ICIC-applicable UE and determines a coordination cell. The coordination cell is a cell on which ICIC as the inter-cell coordination control can be performed. The ICIC-applicable UE determining unit 301 reports to the scheduler 302 the information indicating whether the mobile station is an ICIC-applicable UE and the information on the coordination cell as ICIC-applicable UE information.

The scheduler 302 performs user scheduling based on the ICIC-applicable UE information and CQIs reported from the respective mobile stations. For example, the scheduler 302 allocates frequency resources to the shared channels for the respective mobile stations and allocates CCEs to the E-PDCCHs for the respective mobile stations based on the ICIC-applicable UE information and the CQIs reported from the respective mobile stations. In order to perform user scheduling using the transmission-free region of the cells, the scheduler 302 exchanges the transmission-free region information of the PDSCH and the transmission-free region information of the S-PDCCH with the scheduler 402 of the macro base station 400 that accommodates the coordination cell. This exchange is performed through a wired interface.

Figure 17:
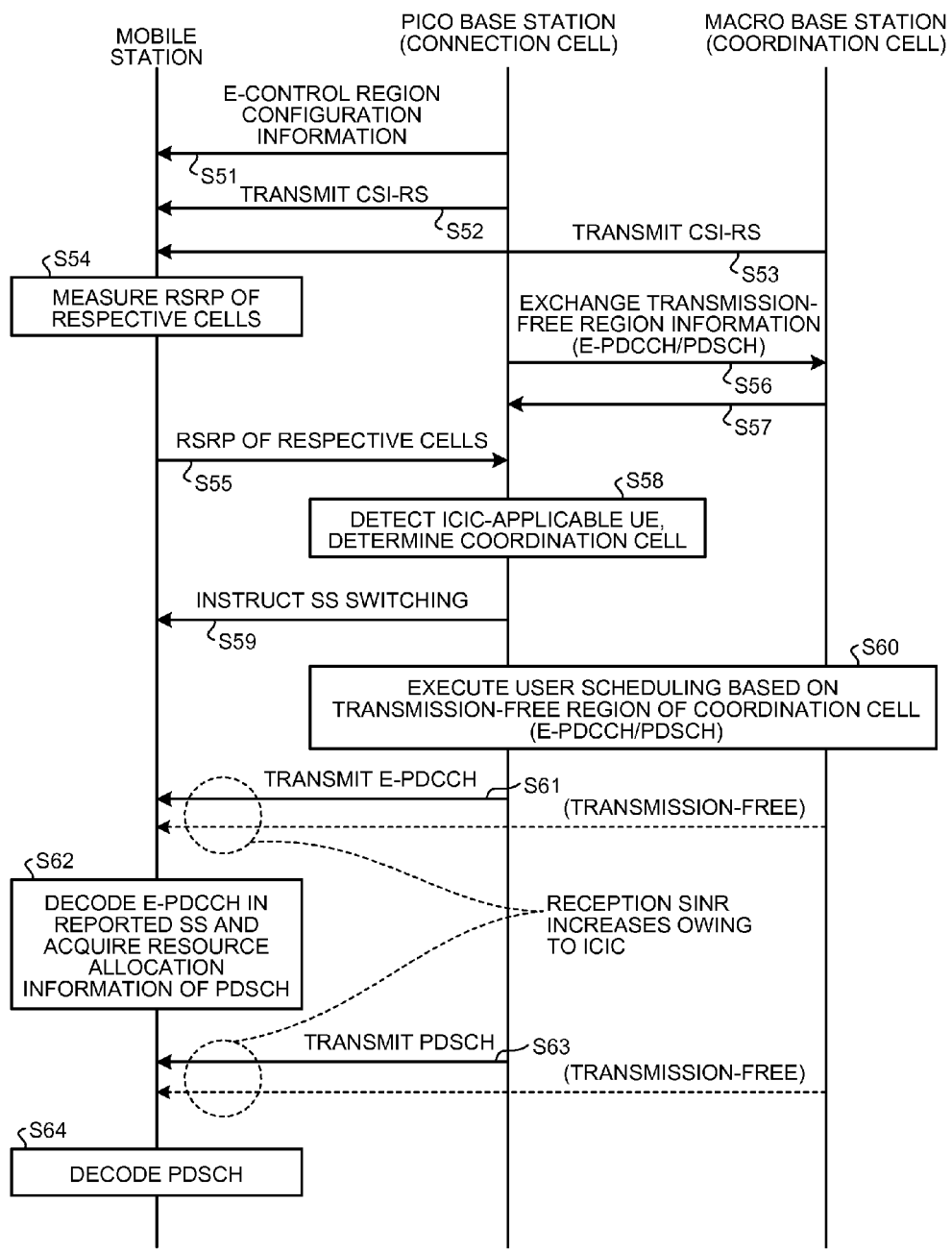
FIG. 17 is a diagram illustrating the operation of the wireless communication system according to the second embodiment.

Described next is operation. The present embodiment assumes a network environment in which a plurality of picocells coexist in a macrocell as illustrated in FIG. 1. FIG. 17 is a diagram illustrating the operation of the wireless communication system 2 according to the second embodiment. The following assumes that the mobile station 10 is connected to the pico base station 300, and the pico base station 300 and the macro base station 400 that belong to a coordinated area hold a common coordinated area ID. The following may call a picocell to which the mobile station 10 is connected a serving cell.

At S51, the pico base station 300 reports to the mobile station 10 the E-Control region configuration information. The mobile station 10 that has received the E-Control region configuration information specifies the arrangement of the E-control region Type1 and the E-control region Type2 to which CCEs are mapped.

At S52, the pico base station 300 transmits the CSI-RS. At S53, the macro base station 400 transmits the CSI-RS. At S54, the mobile station 10 measures the reception power of the CSI-RS for the picocell to which it is connected and its neighboring cells. The neighboring cells include the cells within the coordinated area. At S55, the mobile station 10 reports to the pico base station 300 the measurement result of the reception power as the RSRP.

At S56, the pico base station 300 sets the transmission-free region of the PDSCH and the transmission-free region of the E-PDCCH and reports to the macro base station 400 the transmission-free region information of the PDSCH and the transmission-free region information of the E-PDCCH. At S57, the macro base station 400 sets the transmission-free region of the PDSCH and the transmission-free region of the E-PDCCH and reports to the pico base station 300 the transmission-free region information of the PDSCH and the transmission-free region information of the E-PDCCH.

At S58, the pico base station 300 estimates the state of inter-cell interference in the mobile station 10 based on the RSRP of the respective cells reported from the mobile station 10, and based on the estimation result, detects ICIC-applicable UE, and determines a coordination cell. Specifically, when there is any cell whose α, which indicates the state of inter-cell interference in the mobile station 10, is a predetermined threshold or less among the cells within the coordinated area, the pico base station 300 detects the mobile station 10 connected to the picocell as the ICIC-applicable UE. The pico base station 300 determines a cell with the highest RSRP among the cell whose α is a predetermined threshold or less as a coordination cell. In the present embodiment, it is assumed that the pico base station 300 has determined the macrocell as the coordination cell.

At S59, the pico base station 300 reports to the mobile station 10 the SS switching instruction that instructs the switching of the SS to be searched by the mobile station 10 when decoding the E-PDCCH. Specifically, when the mobile station 10 is the ICIC-applicable UE, the pico base station 300 reports to the mobile station 10 an SS switching instruction that instructs the switching of the current SS to the E-SS Type1 illustrated in FIG. 12. In contrast, when the mobile station 10 is not the ICIC-applicable UE, the pico base station 300 reports to the mobile station 10 an SS switching instruction that instructs the switching of the current SS to the E-SS Type2 illustrated in FIG. 13.

At S60, the pico base station 300 and the macro base station 400 perform user scheduling based on the transmission-free region indicated by the transmission-free region information exchanged at S56 and S57.

Figure 18:
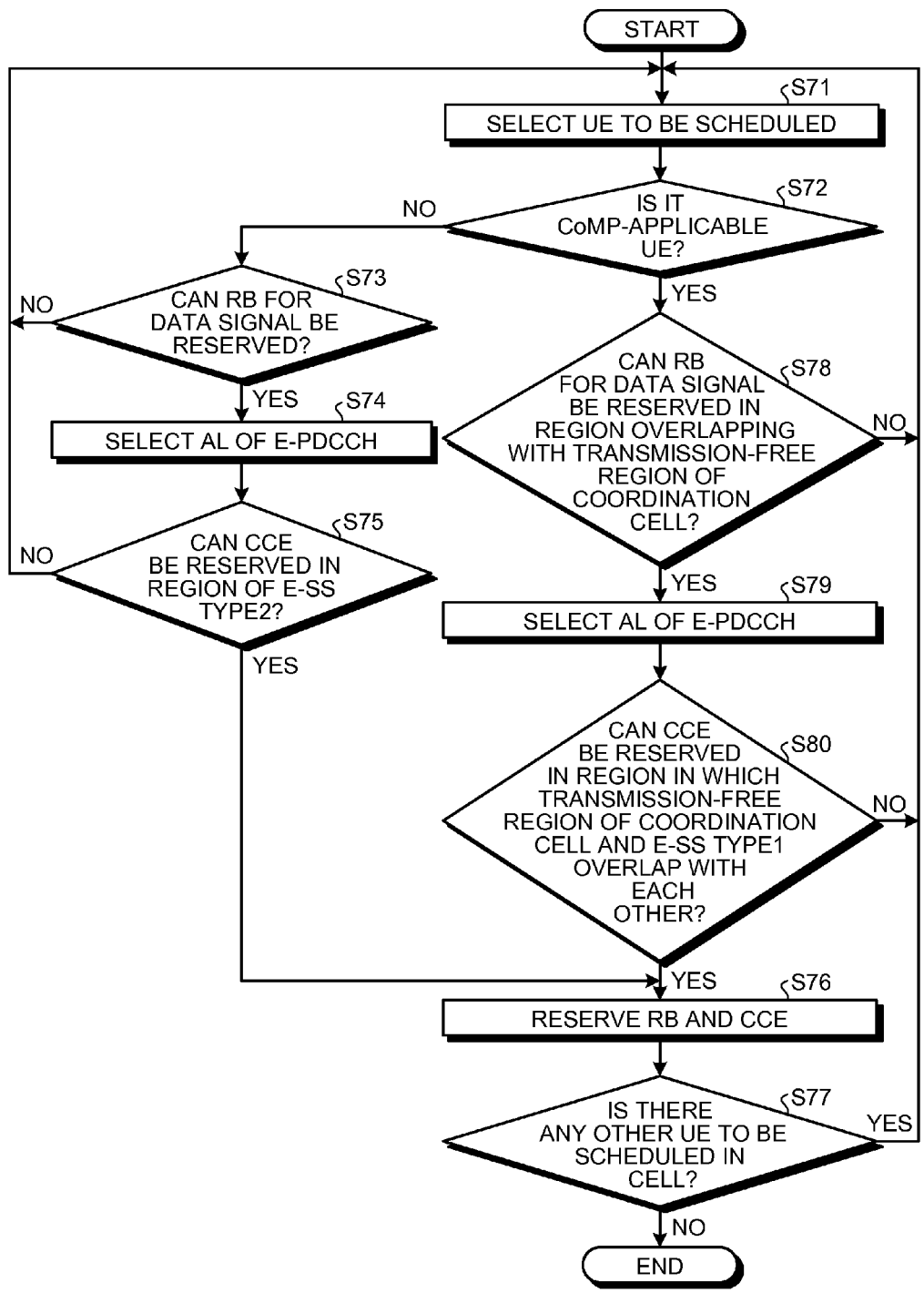
FIG. 18 is a diagram used for describing a user scheduling algorithm of a pico base station and a macro base station according to the second embodiment.

FIG. 18 is a diagram used for describing a user scheduling algorithm performed by the pico base station 300 and the macro base station 400 at S60 according to the second embodiment. Because the pico base station 300 and the macro base station 400 perform the same user scheduling with respect to its processing contents, described here are the processing contents of the pico base station 300 as a representative. Because FIG. 18 is similar to FIG. 14 except that FIG. 18 includes Steps S72, S78, and S80 in place of Steps S32, S38, and S40 in FIG. 14, a detailed description of FIG. 18 is omitted. Steps S71, S73 to S77, and S79 in FIG. 18 correspond to Steps S31, S33 to S37, and S39 in FIG. 14, respectively.

First, when the pico base station 300 selects UE to be scheduled (S71), it is determined whether the UE selected at S71 is the ICIC-applicable UE (S72). As a result of the determination at S72, if the UE selected at S71 is not the ICIC-applicable UE (No at S72), the pico base station 300 advances to the processing at S73 and the subsequent processing.

If the UE selected at S71 is the ICIC-applicable UE (Yes at S72), the pico base station 300 determines whether an RB for a data signal can be reserved in a region in which the transmission-free region of the coordination cell and the RB of the serving cell overlap with each other (S78). As a result of the determination, if the RB can be reserved (Yes at S78), the pico base station 300 advances to the processing at S79. After the processing at S79, the pico base station 300 determines whether a CCE for the E-PDCCH can be reserved in a region in which the transmission-free region of the coordination cell and the E-SS Type1 of the serving cell overlap with each other (S80). As a result of the determination, if the CCE can be reserved (Yes at S80), the pico base station 300 advances to the processing S76 and the subsequent processing.

If it is determined that the RB is not reserved at S78 (No at S78), or if it is determined that the CCEs are not reserved (No at S80), the process returns back to S71, and the processing at S71 and the subsequent processing are performed again.

Returning back to FIG. 17, at S61, the pico base station 300 transmits the E-PDCCH to the mobile station 10 as the ICIC-applicable UE using the CCE for the E-PDCCH in which the transmission-free region of the coordination cell and the E-SS Type1 of the serving cell overlap with each other. Because of no interference by a signal from the coordination cell, the E-PDCCH transmitted from the pico base station 300 at S61 reaches the receiving antenna of the mobile station 10 with an SINR improved. This reduces interference on the E-PDCCH of the ICIC-applicable UE in the picocell from the macrocell.

The pico base station 300 transmits the E-PDCCH using the CCE in the region of E-SS. Type2 to the mobile station 10 not as the ICIC-applicable UE.

At S62, the mobile station 10 performs the switching of the SS in accordance with the SS switching instruction reported from the pico base station 300 at S59 and searches the SS after switching to decode the E-PDCCH. Specifically, the mobile station 10 as the ICIC-applicable UE switches the current SS to the E-SS Type1 and searches the E-SS Type1 to decode the E-PDCCH. The mobile station 10 not as the ICIC-applicable UE switches the current SS to the E-SS Type2 and searches the E-SS Type2 to decode the E-PDCCH. The mobile station 10 acquires the resource allocation information of the PDSCH from the decoded. E-PDCCH.

At S63, the pico base station 300 transmits to the mobile station 10 as the ICIC-applicable UE the PDSCH using the RB of the serving cell overlapping with the transmission-free region of the coordination cell. Because of no interference by a signal from the coordination cell, the PDSCH transmitted from the pico base station 300 at S63 reaches the receiving antenna of the mobile station 10 with an SINR improved. This reduces interference on the PDSCH of the ICIC-applicable UE in the picocell from the macrocell.

The pico base station 300 transmits to the mobile station 10 not as the ICIC-applicable UE the PDSCH using the allocated RB.

At S64, the mobile station 10 decodes the PDSCH mapped to the RB indicated by the resource allocation information acquired at S62 to obtain user data.

As described above, in the wireless communication system 2 according to the second embodiment, the controller 400a of the macro base station 400 sets at least a partial region of the CCEs for inter-cell coordination control as the transmission free region and exchanges the transmission-free region information indicating the transmission-free region with the pico base station 300. Assume a case in which the transmission-free region in the macro base station 400 indicated by the transmission-free region information reported from the macro base station 400 overlaps with the CCEs for inter-cell coordination control. In this case, the communication unit 300b of the pico base station 300 transmits a control signal to the mobile station 10 of the picocell that is on the border with the macrocell as an adjacent cell using the CCE within the overlapping region. This reduces interference between the E-PDCCH and the adjacent cell by the relatively simple method.

Described in the first embodiment and the second embodiment is a case in which the E-Control region Type1 for use in inter-cell coordination control is provided at a time and frequency position common to the two cells within the coordinated area. However, the E-Control region Type1 may be provided at a time and frequency position common to at least two cells among all cells within a coordinated area. Described below is another configuration example of the E-Control region Type1.

Figure 19:
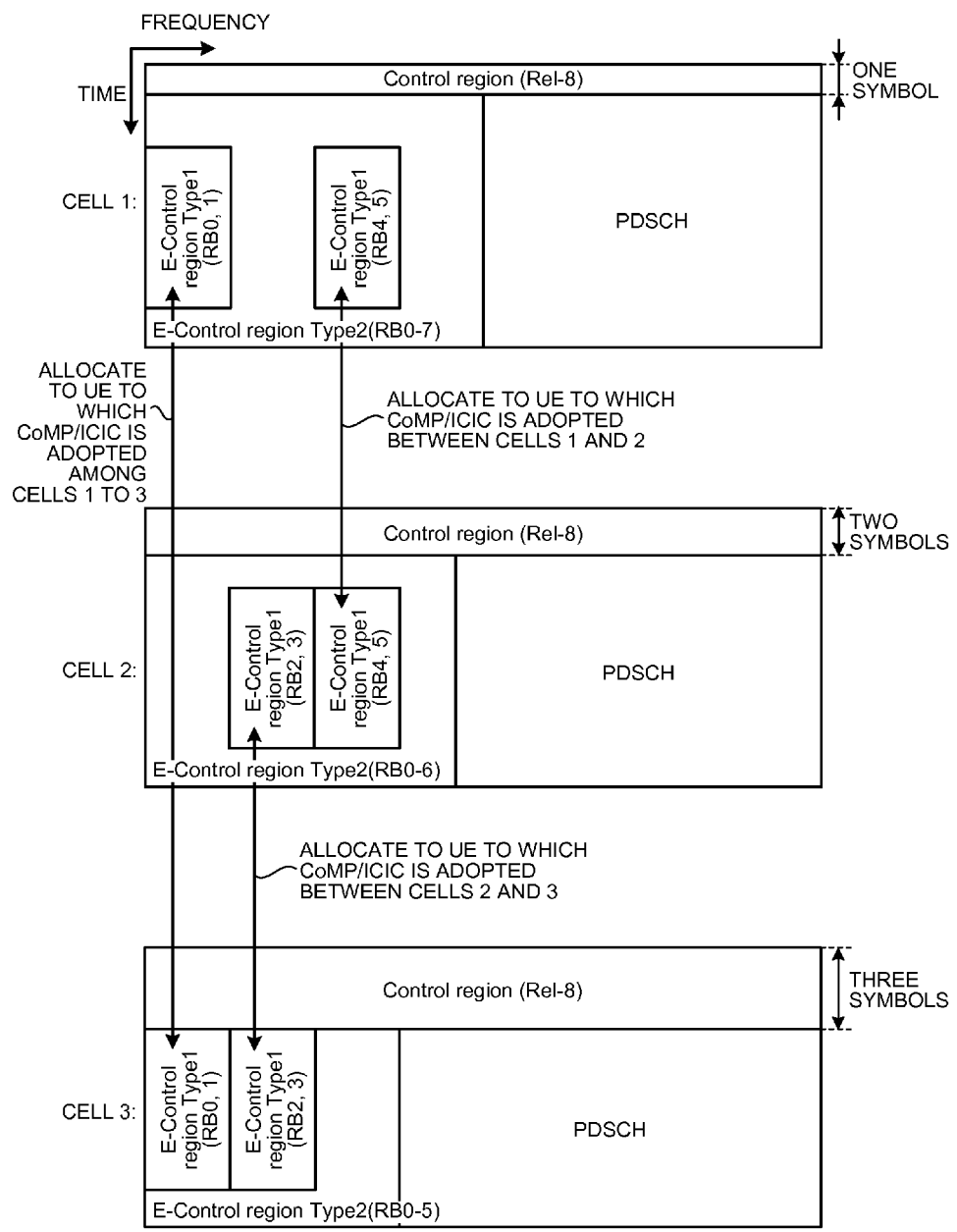
FIG. 19 is a diagram used for describing another configuration example of an E-Control region Type1.

FIG. 19 is a diagram used for describing another configuration example of the E-Control region Type1. As illustrated in FIG. 19, for example, the E-Control region Type1 is provided at positions of an RB0 and an RB1 common to two cells, namely the cell 1 and the cell 3, among all the three cells 1 to 3 within the coordinated area. For example, the E-Control region Type1 is provided at positions of an RB2 and an RB3 common to two cells, namely the cell 2 and the cell 3, among all the three cells 1 to 3 within the coordinated area. For example, the E-Control region Type1 is provided at positions of an RB4 and an RB5 common to two cells, namely the cell 1 and the cell 2, among all the three cells 1 to 3 within the coordinated area. In other words, the E-Control region Type1 may be provided at a time and frequency position common to at least two cells among all cells within the coordinated area.

Assume a case in Which the E-Control region Type1 is provided at a time and frequency position common to at least two cells among all cells within the coordinated area. In this case, the pico base station and the macro base station transmit the E-PDCCH in the E-Control region. Type1 provided at the time and frequency position common to at least two cells.

A description is given using the example illustrated in FIG. 19. The pico base station and the macro base station transmit the E-PDCCH for UE to which CoMP or ICIC is adopted between the cell 1 and cell 3 in the E-Control region Type1 provided at the positions of the RB0 and the RB1 common to the cell 1 and the cell 3. The pico base station and the macro base station transmit the E-PDCCH for UE to which CoMP or ICIC is adopted between the cell 2 and cell 3 in the E-Control region Type1 provided at the positions of the RB2 and the RB3 common to the cell 2 and the cell 3. The pico base station and the macro base station transmit the E-PDCCH for UE to which CoMP or ICIC is adopted between the cell 1 and cell 2 in the E-Control region Type1 provided at the positions of the RB4 and the RB5 common to the cell 1 and the cell 2. The correspondence between the position of the CCEs for inter-cell coordination control and the position of the time and frequency resources to which the CCEs are mapped is common in the E-Control region Type1 of all cells within the coordinated area. As a result, when base stations of different cells transmit the same E-PDCCH on the CCEs for inter-cell coordination control, the technology of CoMP can be adopted to the base stations of the different cells. When base stations of different cell transmit the E-PDCCH so as to be orthogonal on the CCEs for inter-cell coordination control, the technology of ICIC can be adopted to the base stations of the different cells.

The base stations of the different cells can thereby minimize the resource amount of the E-Control region Type1 for use in inter-cell coordination control. As a result, the base stations of the different cells can increase the ratio of a resource amount for the PDSCH or a resource amount of the E-Control region Type2 available among cells. In other words, limited wireless resources can be utilized efficiently.

The first embodiment and the second embodiment expand the control channel to the shared channel region. However, the embodiments can be adopted to cases in which the control channel is expanded to predetermined regions of the respective cells such as a case in which the control channel is expanded to an excess region resulting from a change in the bandwidth of the control channel region or a case in which the control channel is expanded to an arbitrary region that can be set to be the same size among cells.

In the first embodiment and the second embodiment, the wireless communication systems disclosed in the present application reduce interference between the macrocell and picocell. However, the wireless communication systems 1, 2 can be adopted, without being limited thereto, as technologies that reduce interference between a macrocell and a femto cell, interference between a picocell and a femto cell, and interference between picocells.

An embodiment of the wireless communication system disclosed in the present application produces the effect of reducing the inter-cell interference of control channels enhanced to a shared channel region or the like.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system that performs inter-cell coordination control that coordinates a base station of a first cell and a base station of a second cell with each other and transmits a signal to a mobile station of the first cell, the wireless communication system comprising:
   the base station of the first cell including:

a first processor that performs a process including first interleaving resources of a control channel of the first cell enhanced to a predetermined region of the first cell corresponding to a predetermined resource unit based on a common identifier that is an identifier common to the base station of the first cell and the base station of the second cell; and a first transmitter that transmits a control signal to the mobile station of the first cell using a first resource of the control channel of the first cell that corresponds to at least a part of the predetermined resource unit and is to be decoded by the mobile station of the first cell;

the base station of the second cell including:

a second processor that performs a process including second interleaving resources of a control channel of the second cell enhanced to a predetermined region of the second cell corresponding to the predetermined resource unit based on the common identifier; and a second transmitter that transmits a control signal to the mobile station of the first cell using a second resource of the control channel of the second cell that corresponds to at least a part of the predetermined resource unit and is to be decoded by the mobile station of the first cell; and the mobile station of the first cell including:

a receiver that receives the control signal transmitted from the base station of the first cell using the first resource and receives the control signal transmitted from the base station of the second cell using the second resource, wherein the first interleaving includes block-interleaving the resources of the control channel of the first cell in units of a predetermined number of modulation symbols and performing cyclic shift on the block-interleaved resources of the control channel of the first cell in units of the predetermined number of modulation symbols using the common identifier, and the second interleaving includes block-interleaving the resources of the control channel of the second cell in units of the predetermined number of modulation symbols and performing cyclic shift on the block-interleaved resources of the control channel of the second cell in units of the predetermined number of modulation symbols using the common identifier.

2. The wireless communication system according to claim 1, wherein
the predetermined region of the first cell is a shared channel region of the first cell, and
the predetermined region of the second cell is a shared channel region of the second cell.

3. The wireless communication system according to claim 1, wherein
the first interleaving includes interleaving resources of the control channel of the first cell corresponding to a resource unit different from the predetermined resource unit based on an identifier unique to the base station of the first cell,
the first transmitter transmits a control signal to a mobile station that is not to be subjected to the inter-cell coordination control using the resources of the control channel of the first cell corresponding to the resource unit different from the predetermined resource unit,
the second interleaving includes interleaving resources of the control channel of the second cell corresponding to a resource unit different from the predetermined resource unit based on an identifier unique to the base station of the second cell, and the second transmits a control signal to the mobile station that is not to be subjected to the inter-cell coordination control using the resources of the control channel of the second cell corresponding to the resource unit different from the predetermined resource unit.

4. The wireless communication system according to claim 1, wherein
the predetermined resource unit is one or more resource blocks (RBs),
the first resource is a resource on a search space unique to the mobile station of the first cell that is referred to when the mobile station of the first cell decodes the control signal transmitted from the base station of the first cell, and
the search space includes a first search space that is set for a mobile station of the first cell that is subjected to the inter-cell coordination control and a second search space that is set for a mobile station of the first cell that is not subjected to the inter-cell coordination control.

5. The wireless communication system according to claim 4, wherein the first processor further performs a process including detecting whether the mobile station of the first cell is subjected to the inter-cell coordination control and reporting to the mobile station of the first cell a search space switching instruction that instructs to switch between the first search space and the second search space in accordance with the detection result.

6. The wireless communication system according to claim 1, wherein the first processor further performs a process including reporting to the mobile station of the first cell at least information on a position of a resource to which the predetermined resource unit is mapped and information on a unit bandwidth of the resource to which the predetermined resource unit is mapped as configuration information needed for determination of the resource to which the predetermined resource unit is mapped.

7. The wireless communication system according to claim 1, wherein the first transmitter and the second transmitter transmit a same control signal using a same resource included in the predetermined resource unit.

8. The wireless communication system according to claim 1, wherein the second processor further performs a process including setting transmission power of at least a partial region of the predetermined resource unit to be zero or a value smaller than a current value and exchanging region information indicating the partial region whose transmission power is set to be zero or the value smaller than the current value with the base station of the first cell with which the inter-cell coordination control is performed.

9. The wireless communication system according to claim 8, wherein when the partial region whose transmission power is set to be zero or the value smaller than the current value in the base station of the second cell indicated by the region information reported from the base station of the second cell overlaps with the predetermined resource unit, the first transmits the control signal to the mobile station of the first cell that is on a border with the second cell as an adjacent cell using a predetermined resource unit within the overlapping region.

10. A base station of a first cell in a wireless communication system that performs inter-cell coordination control that coordinates a base station of a first cell and a base station of a second cell with each other and transmits a control signal to a mobile station of the first cell, the base station comprising:

a first processor that performs a process including first interleaving resources of a control channel of the first cell enhanced to a predetermined region of the first cell corresponding to a predetermined resource unit based on a common identifier that is an identifier common to the base station of the first cell and the base station of the second cell; and a first transmitter that transmits a control signal to the mobile station of the first cell using a first resource of the control channel of the first cell that corresponds to at least a part of the predetermined resource unit and is to be decoded by the mobile station of the first cell, wherein the base station of the second cell includes:

a second processor that performs a process including second interleaving resources of a control channel of the second cell enhanced to a predetermined region of the second cell corresponding to the predetermined resource unit based on the common identifier; and a second transmitter that transmits a control signal to the mobile station of the first cell using a second resource of the control channel of the second cell that corresponds to at least a part of the predetermined resource unit and is to be decoded by the mobile station of the first cell, the mobile station of the first cell includes:

a receiver that receives the control signal transmitted from the base station of the first cell using the first resource and receives the control signal transmitted from the base station of the second cell using the second resource, the first interleaving includes block-interleaving the resources of the control channel of the first cell in units of a predetermined number of modulation symbols and performing cyclic shift on the block-interleaved resources of the control channel of the first cell in units of the predetermined number of modulation symbols using the common identifier, and the second interleaving includes block-interleaving the resources of the control channel of the second cell in units of the predetermined number of modulation symbols and performing cyclic shift on the block-interleaved resources of the control channel of the second cell in units of the predetermined number of modulation symbols using the common identifier.

11. A mobile station of a first cell in a wireless communication system that performs inter-cell coordination control that coordinates a base station of a first cell and a base station of a second cell with each other and transmits a control signal to a mobile station of the first cell, the mobile station comprising:

a receiver that receives a control signal transmitted from the base station of the first cell using a first resource of a control channel of the first cell that corresponds to at least a part of a predetermined resource unit and is to be decoded by the mobile station of the first cell and receives a control signal transmitted from the base station of the second cell using a second resource of a control channel of the second cell that corresponds to at least a part of the predetermined resource unit and is to be decoded by the mobile station of the first cell, wherein the base station of the first cell includes:

a first processor that performs a process including first interleaving resources of the control channel of the first cell enhanced to a predetermined region of the first cell corresponding to the predetermined resource unit based on a common identifier that is an identifier common to the base station of the first cell and the base station of the second cell; and a first transmitter that transmits the control signal to the mobile station of the first cell using the first resource of the control channel of the first cell that corresponds to at least a part of the predetermined resource unit and is to be decoded by the mobile station of the first cell, the base station of the second cell includes:

a second processor that performs a process including second interleaving resources of the control channel of the second cell enhanced to a predetermined region of the second cell corresponding to the predetermined resource unit based on the common identifier; and a second transmitter that transmits the control signal to the mobile station of the first cell using the second resource of the control channel of the second cell that corresponds to at least a part of the predetermined resource unit and is to be decoded by the mobile station of the first cell, the first interleaving includes block-interleaving the resources of the control channel of the first cell in units of a predetermined number of modulation symbols and performing cyclic shift on the block-interleaved resources of the control channel of the first cell in units of the predetermined number of modulation symbols using the common identifier, and the second interleaving includes block-interleaving the resources of the control channel of the second cell in units of the predetermined number of modulation symbols and performing cyclic shift on the block-interleaved resources of the control channel of the second cell in units of the predetermined number of modulation symbols using the common identifier.

* * * * *